(12) United States Patent
Minor et al.

(10) Patent No.: US 9,988,758 B2
(45) Date of Patent: Jun. 5, 2018

(54) FABRICS CONTAINING EXPANDED POLYTETRAFLUOROETHYLENE FIBERS

(71) Applicant: W. L. Gore & Associates, Inc., Newark, DE (US)

(72) Inventors: David J. Minor, Elkton, MD (US); Mustafa Arifoglu, Kennett Square, PA (US); Raymond B. Minor, Elkton, MD (US)

(73) Assignee: W. L. Gore & Associates, Inc., Newark, DE (US)

( * ) Notice: Subject to any disclaimer, the term of this patent is extended or adjusted under 35 U.S.C. 154(b) by 333 days.

(21) Appl. No.: 14/968,000

(22) Filed: Dec. 14, 2015

(65) Prior Publication Data

US 2016/0362831 A1    Dec. 15, 2016

Related U.S. Application Data

(63) Continuation-in-part of application No. 14/739,847, filed on Jun. 15, 2015.

(51) Int. Cl.
*D03D 1/00* (2006.01)
*D06M 15/256* (2006.01)
(Continued)

(52) U.S. Cl.
CPC ........... *D06M 15/256* (2013.01); *B32B 5/022* (2013.01); *B32B 5/024* (2013.01); *B32B 5/026* (2013.01);
(Continued)

(58) Field of Classification Search
CPC ........... D06M 15/256; D06M 2101/22; D06M 2200/11; D06M 2200/12; D03D 13/008;
(Continued)

(56) References Cited

U.S. PATENT DOCUMENTS 5,262,234 A * 11/1993 Minor .................... D02G 3/441
264/127
5,264,279 A    11/1993 McGregor
(Continued)

FOREIGN PATENT DOCUMENTS

CN    101027346 A    8/2007
CN    101796245 A    8/2010
(Continued)

OTHER PUBLICATIONS

International Search Report for PCT/US2016/066467 dated Sep. 12, 2017.
(Continued)

*Primary Examiner* — Cephia D Toomer
(74) *Attorney, Agent, or Firm* — Carol A. Lewis White

(57) ABSTRACT

Woven and knit fabrics containing expanded polytetrafluoroethylene (ePTFE) fibers and at least one other fiber are provided. The ePTFE fiber may be woven or knit as a single, non-twisted fiber, as part of a multifilament fiber, or may be twisted or braided with another fiber. The ePTFE fiber, whether alone or in combination with a weave fiber(s), may be utilized in either the warp and/or the weft direction. The woven and knit fabrics are concurrently breathable, lightweight, durable, drapable, and fast drying. The ePTFE fibers have a substantially rectangular configuration. In some embodiments, the woven or knit fabric is flame resistant. In addition, the woven and knit fabrics are quiet, soft, and drapable. Treatments may be provided to the surface of the ePTFE fiber and/or the fabrics to impart one or more desired functionality, such as, for example, oleophobicity, antimicrobial, contamination resistance, or UV stability.

28 Claims, 22 Drawing Sheets

(51) Int. Cl.
| | |
|---|---|
| *B32B 5/02* | (2006.01) |
| *B32B 27/12* | (2006.01) |
| *D03D 13/00* | (2006.01) |
| *D03D 15/00* | (2006.01) |
| *D03D 15/12* | (2006.01) |
| *D04B 1/16* | (2006.01) |
| *D04B 1/26* | (2006.01) |
| *B32B 27/32* | (2006.01) |
| *B32B 27/36* | (2006.01) |
| *B32B 27/40* | (2006.01) |
| *D06M 101/22* | (2006.01) |

(52) U.S. Cl.
CPC .............. *B32B 27/12* (2013.01); *B32B 27/32* (2013.01); *B32B 27/322* (2013.01); *B32B 27/36* (2013.01); *B32B 27/40* (2013.01); *D03D 13/008* (2013.01); *D03D 15/00* (2013.01); *D03D 15/0088* (2013.01); *D03D 15/12* (2013.01); *D04B 1/16* (2013.01); *D04B 1/26* (2013.01); *B32B 2262/0207* (2013.01); *B32B 2262/0215* (2013.01); *B32B 2262/0238* (2013.01); *B32B 2262/0246* (2013.01); *B32B 2262/0253* (2013.01); *B32B 2262/0261* (2013.01); *B32B 2262/0269* (2013.01); *B32B 2262/0276* (2013.01); *B32B 2262/062* (2013.01); *B32B 2262/065* (2013.01); *B32B 2262/08* (2013.01); *B32B 2262/12* (2013.01); *B32B 2262/14* (2013.01); *B32B 2307/3065* (2013.01); *B32B 2307/5825* (2013.01); *B32B 2307/7242* (2013.01); *B32B 2307/732* (2013.01); *D03D 2700/0137* (2013.01); *D06M 2101/22* (2013.01); *D06M 2200/11* (2013.01); *D06M 2200/12* (2013.01); *D10B 2201/02* (2013.01); *D10B 2321/04* (2013.01); *D10B 2321/042* (2013.01); *D10B 2331/02* (2013.01); *D10B 2331/021* (2013.01); *D10B 2331/061* (2013.01); *D10B 2331/301* (2013.01); *Y10T 442/227* (2015.04); *Y10T 442/3114* (2015.04)

(58) Field of Classification Search
CPC .... D03D 15/00; D03D 15/0088; D03D 15/12; D03D 2700/0137; D04B 1/16; D04B 1/26; D10B 2201/02; D10B 2321/04; D10B 2321/042; D10B 2331/02; D10B 2331/021; D10B 2331/061; D10B 2331/301; Y10T 442/227; Y10T 442/3114; B32B 5/024; B32B 5/026; B32B 27/12; B32B 5/022; B32B 27/32; B32B 27/322; B32B 27/36; B32B 27/40; B32B 2262/0207; B32B 2262/0215; B32B 2262/0238; B32B 2262/0246; B32B 2262/0253; B32B 2262/0261; B32B 2262/0269; B32B 2262/0276; B32B 2262/062; B32B 2262/065; B32B 2262/08; B32B 2262/12; B32B 2262/14; B32B 2307/3065; B32B 2307/5825; B32B 2307/7242; B32B 2307/732

See application file for complete search history.

(56) References Cited

U.S. PATENT DOCUMENTS

| | | | |
|---|---|---|---|
| 5,635,124 | A | 6/1997 | Abrams et al. |
| 5,641,844 | A | 6/1997 | Thompson |
| 5,708,044 | A | 1/1998 | Branca |
| 6,132,866 | A | 10/2000 | Nelson et al. |
| 6,541,589 | B1 | 4/2003 | Baillie |
| 7,060,354 | B2 | 6/2006 | Baillie et al. |
| 7,296,394 | B2 | 11/2007 | Clough et al. |
| 7,531,611 | B2 | 5/2009 | Sabol et al. |
| 8,187,733 | B2 | 5/2012 | Kelmartin et al. |
| 8,637,144 | B2 | 1/2014 | Ford |
| 2004/0194444 | A1 | 10/2004 | Vinod et al. |
| 2007/0032152 | A1* | 2/2007 | Kelmartin ............... B32B 27/12 442/88 |
| 2007/0037020 | A1* | 2/2007 | Blake ................. A41D 31/0027 428/219 |
| 2007/0079695 | A1 | 4/2007 | Bucher et al. |
| 2008/0032576 | A1 | 2/2008 | Kelmartin et al. |
| 2008/0228028 | A1 | 9/2008 | Carlson |
| 2008/0299854 | A1 | 12/2008 | Hilleary et al. |
| 2009/0171440 | A1 | 7/2009 | Carlson et al. |
| 2010/0159171 | A1 | 6/2010 | Clough |
| 2010/0159766 | A1 | 6/2010 | Clough et al. |
| 2012/0028529 | A1* | 2/2012 | Fenzi ..................... A41B 17/00 442/203 |
| 2013/0267137 | A1 | 10/2013 | Peniston et al. |
| 2014/0120286 | A1 | 5/2014 | Wendlandt et al. |
| 2014/0212612 | A1 | 7/2014 | Sbriglia |
| 2015/0079865 | A1 | 3/2015 | Minor |
| 2016/0213078 | A1* | 7/2016 | Bibeau ............... A41D 31/0027 |

FOREIGN PATENT DOCUMENTS

| | | |
|---|---|---|
| EP | 2546398 | 1/2013 |
| EP | 3155153 | 4/2017 |
| TK | 1994/002668 | 3/1994 |
| WO | WO0207961 | 1/2002 |
| WO | 2008/148126 | 12/2008 |
| WO | 2010/092462 | 8/2010 |
| WO | 2013/151950 | 10/2013 |
| WO | 2015/041779 | 3/2015 |

OTHER PUBLICATIONS

Biladt et al., Lenzing PROFILEN® PTFE Fibers in Medical Textile Applications, Lenzinger Berichte 91 (2013) 56-60.

* cited by examiner

FABRICS CONTAINING EXPANDED POLYTETRAFLUOROETHYLENE FIBERS

FIELD

The present disclosure relates generally to fabrics, and more specifically to a fabrics formed from expanded polytetrafluoroethylene (ePTFE) fibers and at least one other fiber that is lightweight, breathable, drapable, durable, and dries in 30 min or less.

BACKGROUND

Sufficiently durable protective and comfortable clothing is well-known in the art, and is generally constructed from different fabric materials for different applications. These materials have been constructed utilizing man-made, natural, or blended fibers thereof which are woven or knitted, colored, and subsequently cut and sewn into garments. Examples of natural fibers may include cotton (cellulose) or wool (protein), and examples of man-made fibers may include aramid, polyester, or polyamide (organic). In addition, these fibers may take the form of staple, filament, plied, textured or other, depending on the material used.

One such application example is a military combat uniform. Traditionally, these were constructed from heavy woven 100% staple cotton fabrics, which have been utilized to provide sufficient durability and comfort along with no melt/no drip performance when exposed to flame (prevents meltable material from attaching to the skin). When lighter weight was needed along with sufficient durability, an intimate staple blend of polyester/cotton or polyamide/cotton was created to enhance durability while still meeting the no melt/no drip and comfort requirements. If no melt/no drip is not important, as is in many consumer applications, garments may also be constructed from man-made high strength filament nylon or polyester fibers in addition to cotton for even lighter, durable and comfortable applications. If flame resistance is needed, Nomex® staple fibers or blends thereof are typically used to prevent burn injuries while providing acceptable durability and comfort.

To even further enhance properties, many additional blends and treatments have been created. A durable water repellent treatment may be applied to lower the surface energy of a fabric to repel water for a period of time. Fibers may be imbibed with silicon to prevent entry into the fiber bundle structure for a period of time. Low friction, hydrophobic fibers have been added in a blend to reduce friction upon skin contact (or another surface) with the fabric as well as alter wicking characteristics with push/pull phenomenon. However, one significant arena in fabrics that is yet to be achieved is to create fabrics that can be mechanically durable (high tear strength, break strength, and coverage), highly comfortable (next to skin wicking comfort, great skin sensorial, high breathability) with durable very low water weight gain, and fast dry out at a variety of weight ranges.

The need for a garment to dry fast is particularly important in hot and humid environments where users need highly durable, comfortable, and protective clothing that does not gain a lot of water weight and take a long time to dry. Typically, water weight gain is dependent upon the amount of material used (the higher the fabric weight, the more water it can hold). This is because most fibers have a limited density and porosity within the fiber bundle for water to fill, with sometimes additional space for moisture in hygroscopic fibers. Therefore, fabrics tend to be heavy in order to be durable enough in use, which lead to discomfort from long dry times and significant water weight gain. Water repellent treatments, intimately blended staple fibers, high strength fibers, and filled fibers have not yet been found to be durable or comfortable enough to be widely adopted over traditional natural or synthetic fabrics, such as cotton, polyamide, polyester, wool, and aramid in this realm.

Therefore, there exists a need in the art to create durable, fast dry (has a low water pick-up), comfortable, easy to clean, and protective fabrics in the art.

SUMMARY

One embodiment of the invention relates to a woven fabric that includes a plurality of warp and weft fibers where the warp fibers include at least one fire resistant fiber and the weft fibers include at least one expanded polytetrafluoroethylene (ePTFE) fiber combined with at least one cellulosic fiber. The ePTFE fiber has a weight per length of greater than about 20 dtex. In at least one embodiment, the cellulosic fiber is a fire resistant cotton fiber. The woven fabric may have a polymer membrane and/or a woven, non-woven, or knit fabric affixed to at least one side of the fabric. Further, the ePTFE fiber may contain therein a colorant to color the ePTFE fiber.

A second embodiment of the invention relates to a woven fabric that includes a plurality of warp and weft fibers where the warp fibers include blended cotton fibers and the weft fibers include expanded polytetrafluoroethylene (ePTFE) fibers that have a weight per length of greater than about 20 dtex. In one or more embodiment, the blended cotton fibers are selected from polyester/cotton fibers and nylon/cotton fibers. In one exemplary embodiment, the weft fibers may include the ePTFE fibers at every other pick. A polymer membrane and/or a woven, non-woven, or knit fabric may be affixed to at least one side of the fabric. Further, the ePTFE fiber may contain therein a colorant to color the ePTFE fiber.

A third embodiment of the invention relates to a woven fabric that includes a plurality of warp and weft fibers where the warp fibers include blended synthetic fibers and the weft fibers include expanded polytetrafluoroethylene (ePTFE) fibers that have a weight per length of greater than about 20 dtex. In one or more embodiment, the blended synthetic fibers are nylon/lycra fibers. In one exemplary embodiment, the weft fibers consist of the ePTFE fibers. In another exemplary embodiment, the weft fibers include the ePTFE fibers at every other pick. A polymer membrane and/or a woven, non-woven, or knit fabric is affixed to at least one side of the fabric. Further, the ePTFE fiber may contain therein a colorant to color the ePTFE fiber.

A fourth embodiment of the invention relates to a knit fabric that includes expanded polytetrafluoroethylene (ePTFE) fibers combined with non-polytetrafluoroethylene (PTFE) fibers in a knit configuration. The ePTFE fibers have a weight per length from about 20 dtex to about 1200 dtex. In at least one exemplary embodiment, the ePTFE fibers are positioned in a side-by-side configuration with the non-PTFE fibers. Further, the ePTFE fiber may contain therein a colorant to color the ePTFE fiber.

A fifth embodiment of the invention relates to a woven fabric that includes a plurality of warp fibers and weft fibers. At least one of the warp fibers and weft fibers include expanded polytetrafluoroethylene (ePTFE) fibers. Additionally, at least one of the warp fibers and the weft fibers include non-polytetrafluoroethylene (PTFE) fibers. The ePTFE fibers have a weight per length from about 20 dtex to about 1200 dtex. A polymer membrane and/or a woven, nonwoven, or knit fabric is affixed to at least one side of the fabric. Further, the ePTFE fiber may contain therein a colorant to color the ePTFE fiber.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

Figure 30:
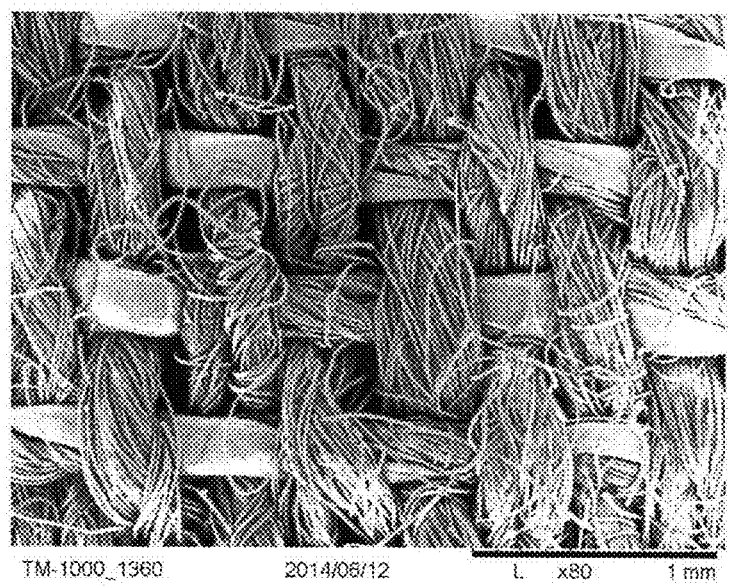
FIG. 30 is scanning electron micrograph of the top surface of a 1×2 woven twill fabric with the fiber depicted in FIG.
Figure 31:
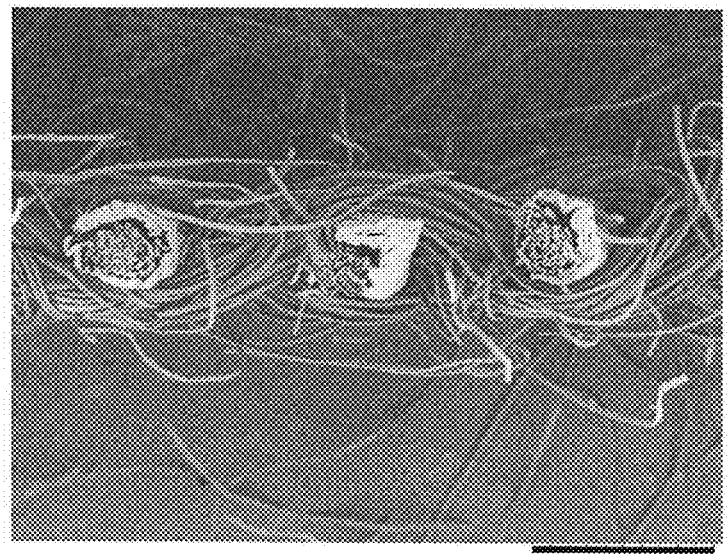
Figure 32:
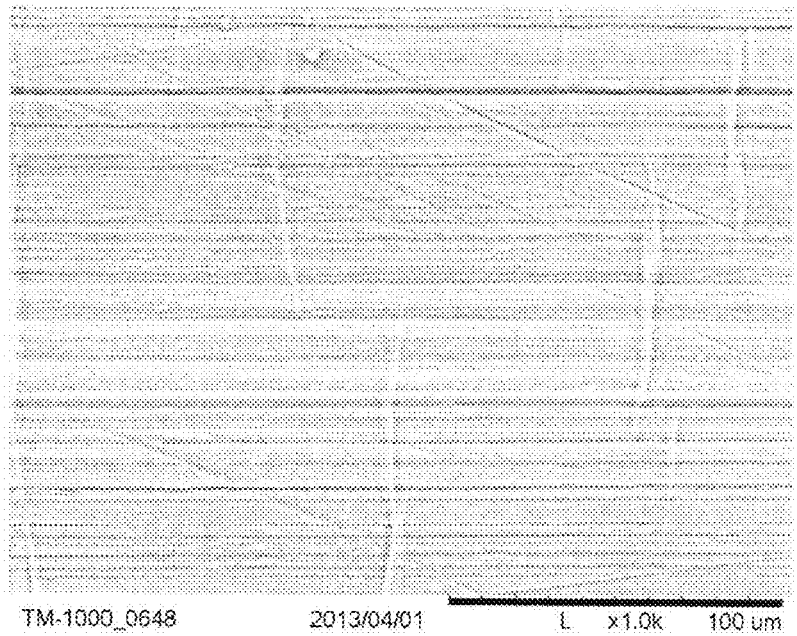
Figure 33:
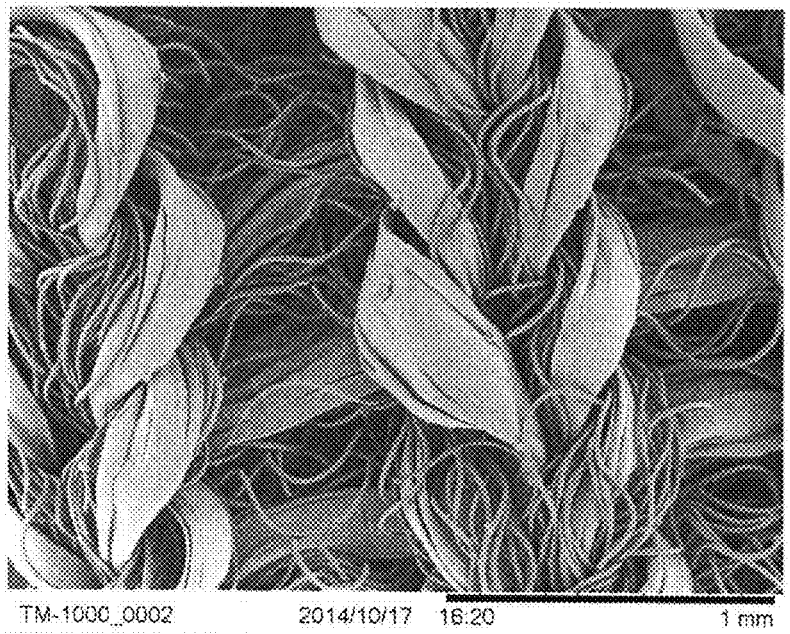
Figure 34:
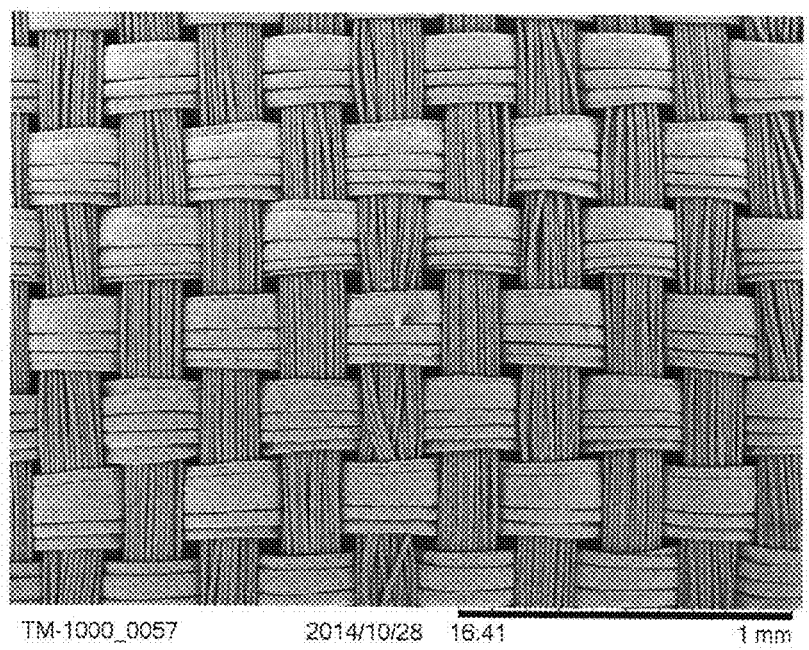
Figure 35:
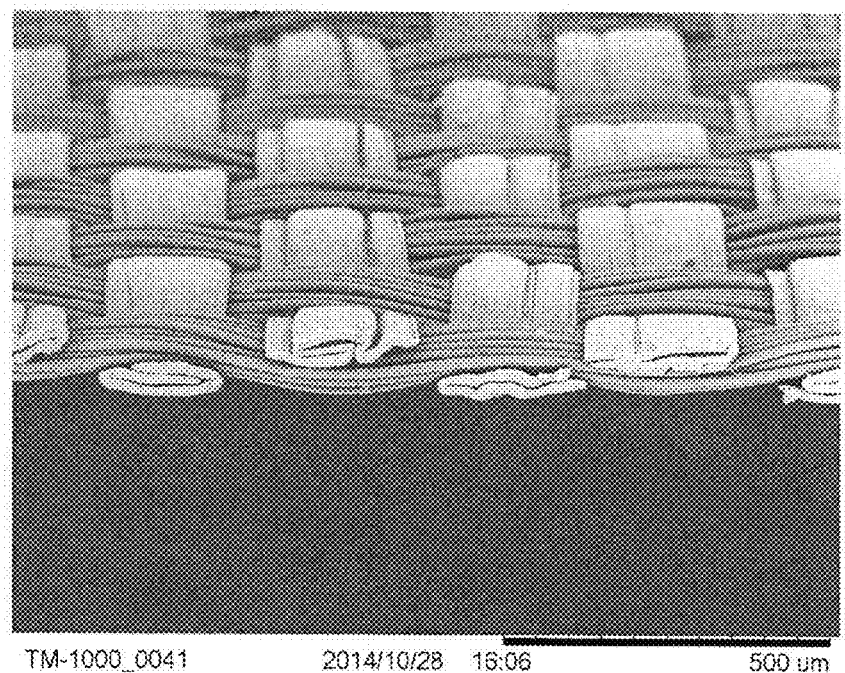
Figure 36:
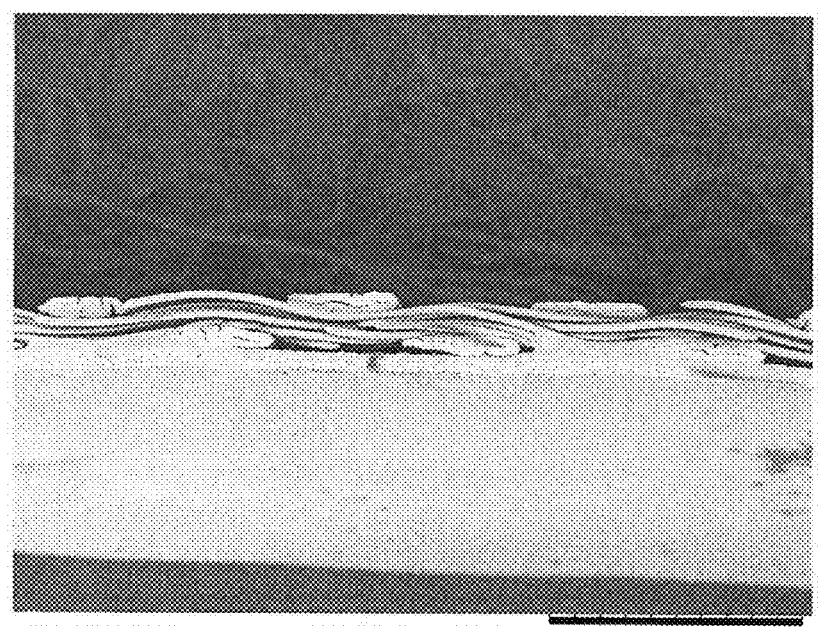
Figure 37:
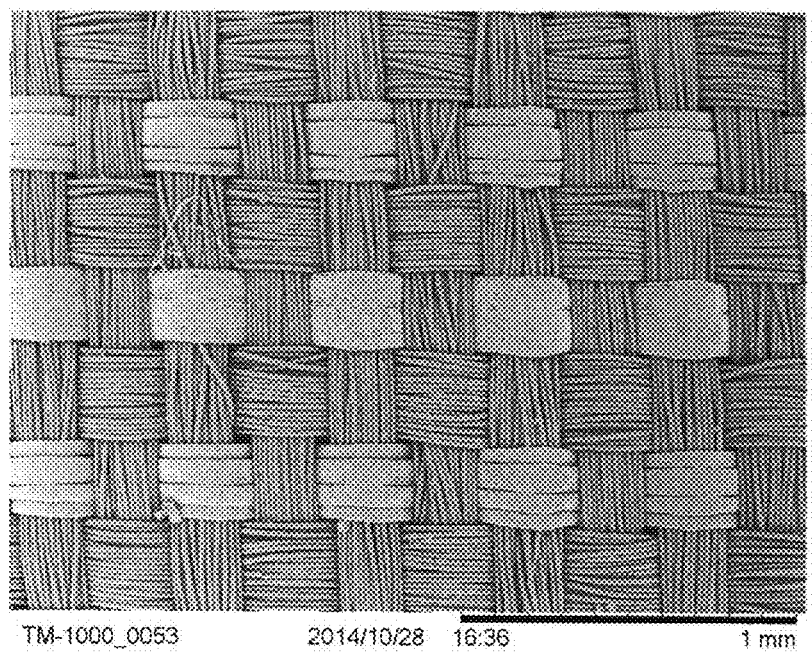
Figure 38:
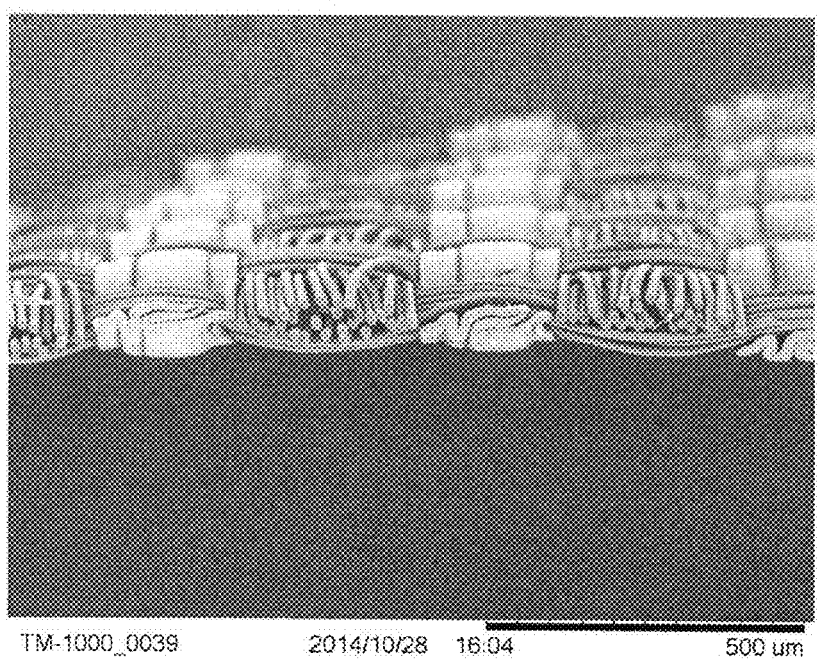
Figure 39:
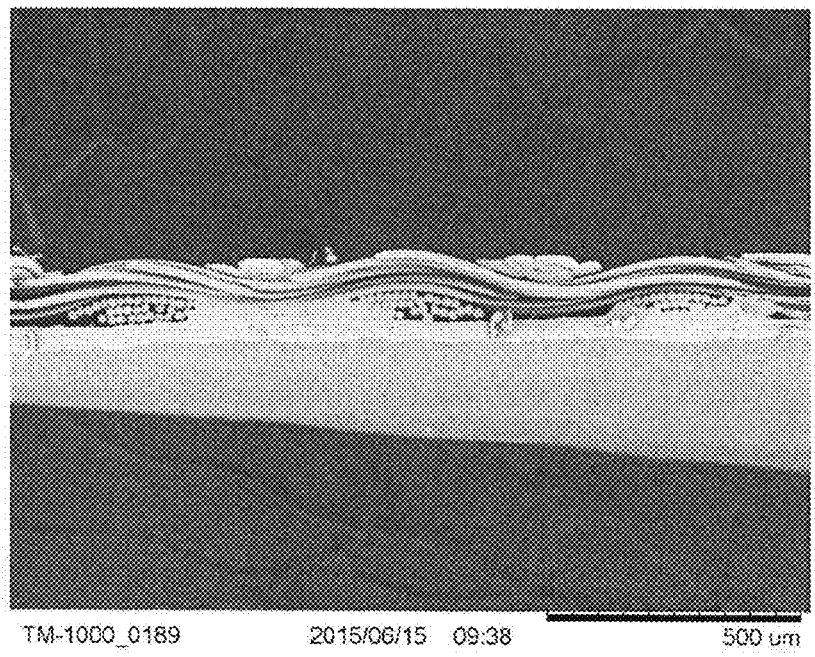
Figure 40:
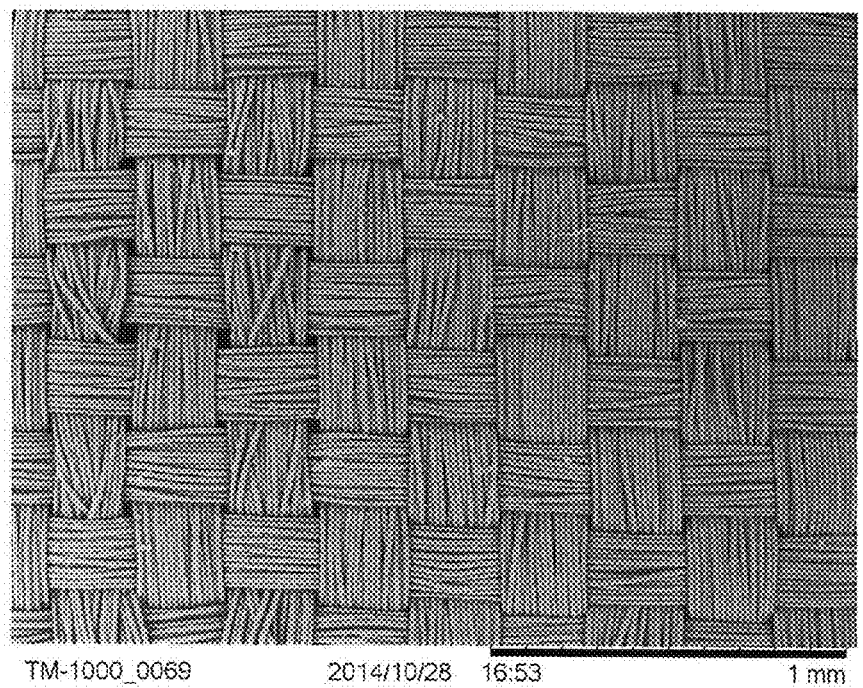
Figure 41:
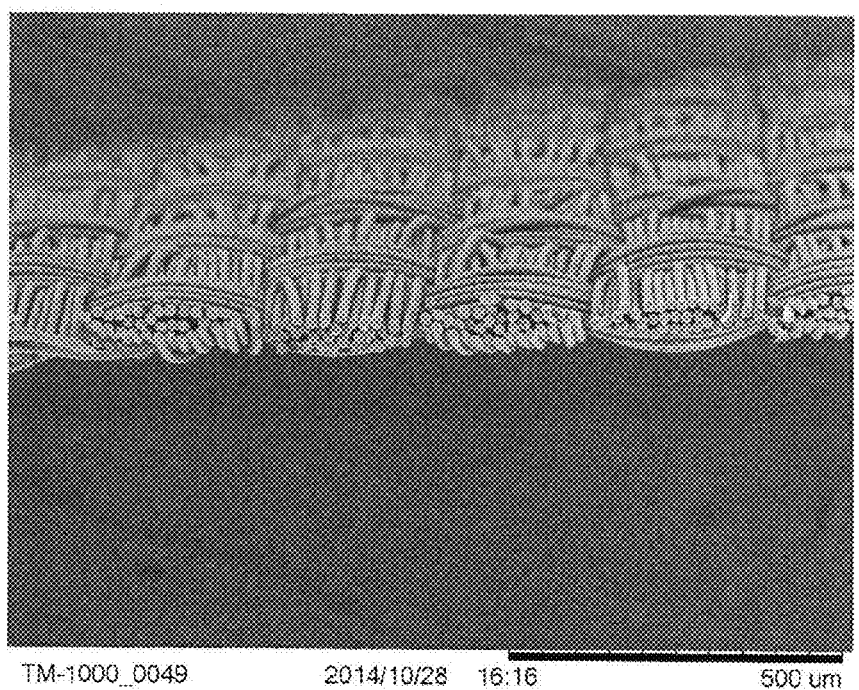
Figure 42:
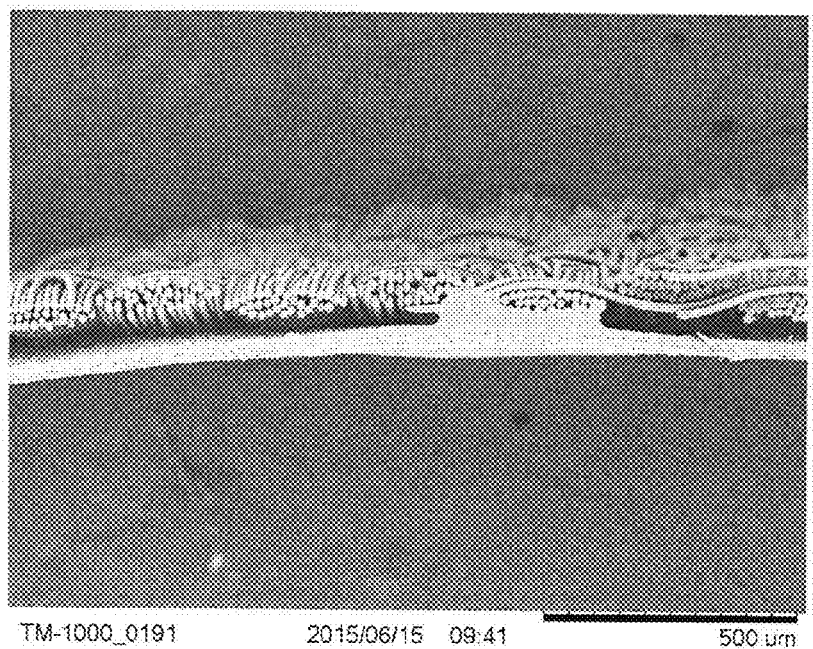
Figure 43:
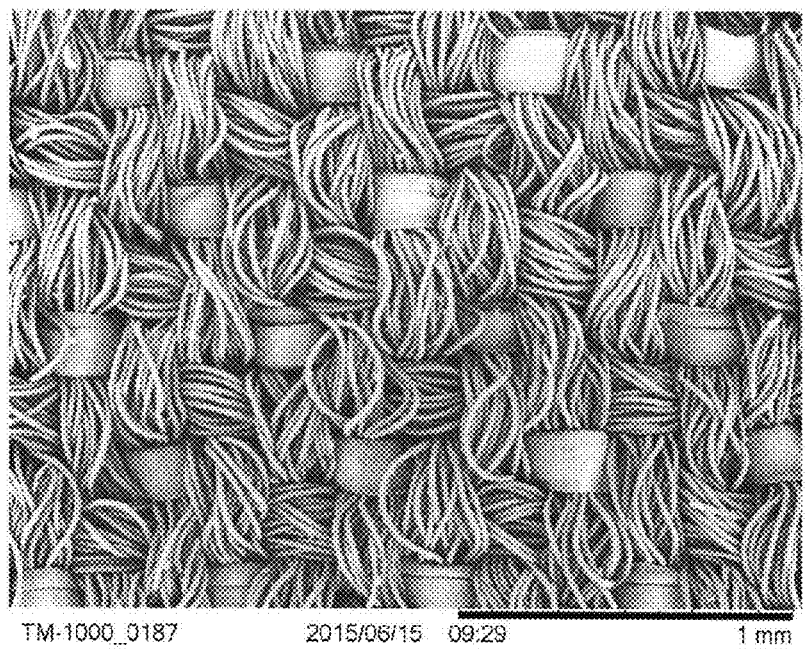
Figure 44:
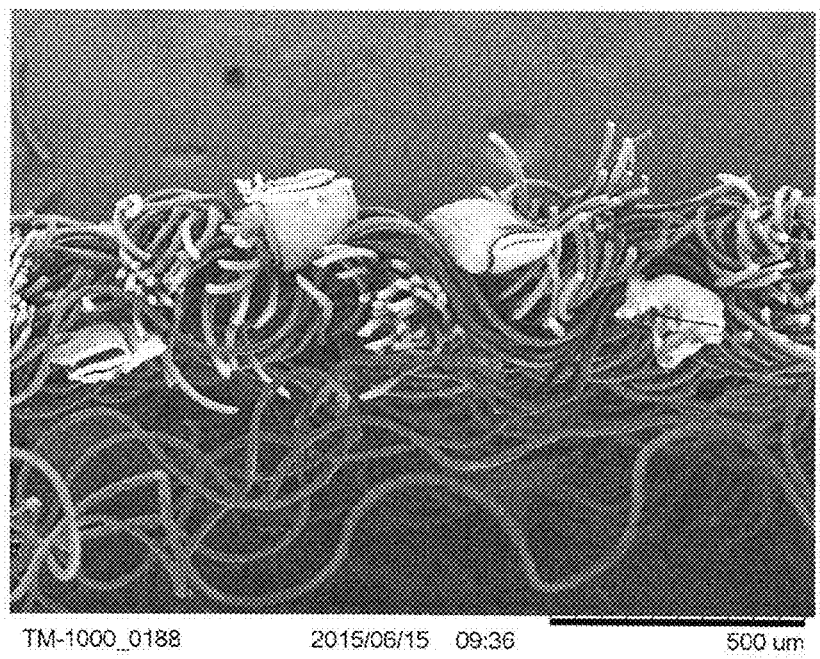

8, twisted and inserted at every weft pick, taken at 80× magnification according to one embodiment of the invention;

FIG. 31 is a scanning electron micrograph of a cross-section of the woven fabric depicted in FIG. 30 taken at 120× magnification in accordance with at least one exemplary embodiment of the invention;

FIG. 32 is a scanning electron micrograph of the top surface of the expanded polytetrafluoroethylene (ePTFE) fiber of Example 4 taken at 1000× magnification;

FIG. 33 is a scanning electron micrograph of the top surface of the knitted fabric of Example 4 taken at 80× magnification;

FIG. 34 is scanning electron micrograph of the top surface of a plain woven fabric with the fiber depicted in FIG. 32, inserted at every weft pick, taken at 80× magnification according to one embodiment of the invention;

FIG. 35 is a scanning electron micrograph of a cross-section of the woven fabric depicted in FIG. 34 taken at 150× magnification in accordance with at least one exemplary embodiment of the invention;

FIG. 36 is a scanning electron micrograph of a cross-section of the woven fabric depicted in FIG. 34 laminated to a membrane taken at 120× magnification in accordance with at least one exemplary embodiment of the invention;

FIG. 37 is scanning electron micrograph of the top surface of a plain woven fabric with the fiber depicted in FIG. 32, inserted at every other weft pick, taken at 80× magnification according to one embodiment of the invention;

FIG. 38 is a scanning electron micrograph of a cross-section of the woven fabric depicted in FIG. 37 taken at 150× magnification in accordance with at least one exemplary embodiment of the invention;

FIG. 39 is a scanning electron micrograph of a cross-section of the woven fabric depicted in FIG. 37 laminated to a membrane taken at 120× magnification in accordance with at least one exemplary embodiment of the invention;

FIG. 40 is scanning electron micrograph of the top surface of a plain woven fabric of polyamide taken at 80× magnification according to one embodiment of the invention;

FIG. 41 is a scanning electron micrograph of a cross-section of the woven fabric depicted in FIG. 40 taken at 150× magnification in accordance with at least one exemplary embodiment of the invention;

FIG. 42 is a scanning electron micrograph of a cross-section of the woven fabric depicted in FIG. 37 laminated to a membrane taken at 120× magnification in accordance with at least one exemplary embodiment of the invention;

FIG. 43 is scanning electron micrograph of the top surface of a 1×2 woven twill fabric with the fiber depicted in FIG. 32 inserted at every other weft pick taken at 80× magnification according to one embodiment of the invention; and FIG. 44 is a scanning electron micrograph of a cross-section of the woven fabric depicted in FIG. 43 taken at 120× magnification in accordance with an exemplary embodiment of the invention.

GLOSSARY

As used herein, the term "amorphously locked" is meant to denote that the polytetrafluoroethylene (PTFE) material has been heated above its crystalline melt temperature of the PTFE.

As used herein, the terms "fiber", "monofilament fiber" and "monofilament ePTFE fiber" are meant to describe an ePTFE fiber that is continuous or substantially continuous in nature which may be woven into a fabric.

The term "low density fiber" or "low density ePTFE fiber" as used herein are meant to describe fibers that have a pre-weaving density less than about 1.0 g/cm$^3$.

The term "conformable" and "conformable fiber" as used herein are meant to describe fibers that are capable of curling and/or folding upon themselves to conform to weave spacing provided between the crossovers of the warp and weft fibers and as determined by the number of picks per inch and/or ends per inch of the warp and weft fibers.

"High water entry pressure" as used herein is meant to describe a woven fabric with a water entry pressure greater than about 1 kPa.

"Microporous" is defined herein as having pores that are not visible to the naked eye.

As used herein, the terms "breathable" and "breathability" refer to ePTFE woven fabrics that have a moisture vapor transmission rate (MVTR) of at least about 3000 grams/m$^2$/24 hour.

The term "substantially rectangular configuration" as used herein is meant to denote that the conformable fibers have a rectangular or nearly rectangular cross section, with or without a rounded or pointed edge (or side) and an aspect ratio greater than 1.

The term "substantially round" as used herein is meant to denote that the ePTFE fibers have a round or nearly round configuration and an aspect ratio of the ePTFE fibers of about 1.

As used herein, the term "textile" is meant to denote any woven, nonwoven, felt, fleece, or knit and can be composed of natural and/or synthetic fiber materials and/or other fibers or flocking materials.

The terms "weave fiber" and "knit fiber" as used herein are meant to denote the fiber or fibers that are woven or knit with the ePTFE fiber to form a woven or knit fabric, respectively.

As used herein, the term "elastic" is meant to denote a material that can be tensioned and which returns to its approximate original dimensions upon release of the tension.

As used herein, the term "dry" is meant to denote dry weight at standard conditions.

The term "on" as used herein is meant to denote that when an element is "on" another element, it can be directly on the other element or intervening elements may also be present.

The terms "adjacent" and "adjacent to" as used herein are meant to denote that when an element is "adjacent" to another element, the element may be directly adjacent to the other element or intervening elements may be present.

DETAILED DESCRIPTION

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

The present invention relates to a woven or knit fabric that contains expanded polytetrafluoroethylene (ePTFE) fibers and at least one other fiber. In at least one embodiment, at least one other fiber is a non-ePTFE fiber. The ePTFE fiber may be woven or knit as a single fiber, as part of a multifilament fiber, or may be combined (e.g., twisted or braided) with another fiber. In addition, the ePTFE fiber may contain therein pigments or other colorants to color the ePTFE fiber. In one embodiment, the ePTFE fiber contains therein a pigment or other colorant to color the ePTFE fiber. Non-limiting examples of suitable pigments/colorants include, but are not limited to, titanium dioxide, carbon black, mica, silica. Further, fluids may be used which include dielectric fluids or materials such as the polysiloxane materials shown in U.S. Pat. No. 3,278,673 to Gore. The fabrics concurrently possesses high moisture vapor transmission (i.e., highly breathable), are highly durable, are lightweight, and are fast drying. The woven or knit fabric can be colorized, such as, for example, by dyeing or printing. In addition, the fabrics are quiet, soft, and drapable, making it especially suitable for use in garments, tents, covers, bivy bags, footwear, and gloves. It is to be noted that the term "fabrics" is meant to include both woven and knit fabrics.

The ePTFE fibers used herein may have a pre-weaving or pre-knitting density from about 0.1 $g/cm^3$ to about 2.2 $g/cm^3$, from about 0.2 $g/cm^3$ to about 2.1 $g/cm^3$, from about 0.3 $g/cm^3$ to about 2.0 $g/cm^3$, or from about 0.4 $g/cm^3$ to about 1.9 $g/cm^3$. It is to be noted that processes used to make a fabric, such as weaving, may increase the density of the fibers. In at least one embodiment, the post-weaving density is greater than about 1.2 $g/cm^3$ and less than about 2.3 $g/cm^3$.

In one exemplary embodiment, the ePTFE fibers have a pre-weaving or pre-knitting density less than about 1.0 $g/cm^3$ and a node and fibril structure where the nodes are interconnected by fibrils, the space between which defines passageways through the fibers. Also, the conformable node and fibril fibers are microporous. The node and fibril structure within the fiber permits the ePTFE fiber, and fabrics woven from the ePTFE fiber, to be highly breathable and allow for the penetration of colorants and oleophobic compositions.

The low density of the ePTFE fiber (both pre- and post-weave or knit) enhances the breathability of the fabrics made therewith. In one embodiment, the ePTFE fibers have a pre-weaving or pre-knitting density less than about 0.9 $g/cm^3$, less than about 0.8 $g/cm^3$, less than about 0.7 $g/cm^3$, less than about 0.6 $g/cm^3$, less than about 0.5 $g/cm^3$, less than about 0.4 $g/cm^3$, less than about 0.3 $g/cm^3$, less than about 0.2 $g/cm^3$, or less than about 0.1 $g/cm^3$. One non-limiting example of such a conformable, breathable, microporous fiber is an ePTFE fiber that has a pre-weaving density less than about 1.0 $g/cm^3$ taught in U.S. Patent Publication No. 2015/0079865 to Minor, et al. Other non-limiting examples of suitable low density ePTFE fibers include those fibers made in accordance with the teachings of U.S. Pat. No. 7,060,354 to Baille, et al., U.S. Patent Publication No. 2014/0120286 to Wendlandt et al., and U.S. Pat. No. 8,187,733 to Kelmartin, et al.

Also, the matrix provided by the nodes and fibrils in the low density ePTFE fibers (e.g., density less than about 1.0 $g/cm^3$) allows for the inclusion of desired fillers and/or additives. For example, the ePTFE fiber may be filled or partially filled with an oil and/or another polymer. Such additives essentially fill the spaces provided by the nodes and fibrils and prevents the passage of liquid water; however, in some instances, water vapor is able to pass through the filled fiber. Some additives and/or fillers may include a functionality to impart a desired feature, such as, but not limited to, anti-microbial, anti-fungal, insect repellence, or contamination resistance to the fiber. In addition, the additives and/or fillers may be used to render the ePTFE fiber hydrophilic. The filled low density ePTFE fiber functions similar to a high density ePTFE fiber (e.g., density greater than about 1.0 $g/cm^3$) in that it is essentially non-water absorptive.

In another embodiment, the ePTFE fibers have a pre-weaving or pre-knitting density greater than about 1.0 $g/cm^3$ and have essentially no node and fibril structure (e.g., high density ePTFE fibers). In exemplary embodiments, the ePTFE fibers have a density greater than about 1.1 $g/cm^3$, greater than about 1.2 $g/cm^3$, greater than about 1.4 $g/cm^3$, greater than about 1.5 $g/cm^3$, greater than about 1.7 $g/cm^3$, or greater than about 1.9 $g/cm^3$. In some embodiments, the ePTFE fibers have a density from about 1.0 $g/cm^3$ to about 2.2 $g/cm^3$. In the dense ePTFE fibers, the fibrils are mostly collapsed, making the fiber non-breathable. In addition, dense ePTFE fibers have a high tensile strength and a small profile (cross-section area). In fabrics where the dense ePTFE fibers are utilized, breathability of the fabric is due to spaces between the warp and weft fibers.

It is to be appreciated that with respect to the ePTFE fibers; reference is made herein with respect to expanded polytetrafluoroethylene fibers for ease of discussion. However, it is to be understood that any suitable conformable fluoropolymer may be used interchangeably with ePTFE as described within this application. Non-limiting examples of fluoropolymers include, but are not limited to, expanded PTFE, expanded modified PTFE, expanded copolymers of PTFE, fluorinated ethylene propylene (FEP), and perfluoroalkoxy copolymer resin (PFA). Patents have been granted on expandable blends of PTFE, expandable modified PTFE, and expanded copolymers of PTFE, such as, but not limited to, U.S. Pat. No. 5,708,044 to Branca; U.S. Pat. No. 6,541,589 to Baillie; U.S. Pat. No. 7,531,611 to Sabol et al.; U.S. Pat. No. 8,637,144 to Ford; and U.S. patent application Ser. No. 12/410,050 to Xu et al.

In one or more embodiment, the woven or knit fabrics may include one or more of the following materials: ultra-high molecular weight polyethylene as taught in U.S. Patent Publication No. 2014/0212612 to Sbriglia; polyparaxylylene as taught in U.S. Provisional Application No. 62/030,419 to Sbriglia; polylactic acid as taught in U.S. Provisional Patent Application No. 62/030,408 to Sbriglia, et al.; and/or VDF-co-(TFE or TrFE) polymers as taught in U.S. Provisional Patent Application No. 62/030,442 to Sbriglia.

Additionally, the ePTFE fibers have a substantially rectangular configuration. At least FIGS. 2 and 4 of this application depict exemplary ePTFE fibers having substantially rectangular configurations. As used herein, the term "substantially rectangular configuration" is meant to denote that the fibers have a rectangular or nearly rectangular cross section. That is, the ePTFE fibers have a width that is greater than its height (thickness). It is to be noted that the fibers may have a rounded or pointed edge (or side). Unlike conventional fibers that must be twisted prior to weaving, the ePTFE fibers can be woven or knit while in a flat state without having to first twist the ePTFE fiber. The ePTFE fibers may be advantageously woven with the width of the fiber oriented so that it forms the top surface of the woven fabric. Thus, woven fabrics constructed from the ePTFE fibers may have a flat or substantially flat weave and a corresponding smooth surface. The smooth, planar surface of the fabric enhances the softness of the woven fabric. In exemplary embodiments, the aspect ratio (i.e., width to height ratio) of the ePTFE fibers is greater than 1. In some embodiments, the aspect ratio is greater than about 2, greater than about 5, greater than about 10, greater than about 15, greater than about 20, or greater than about 25. A high aspect ratio, such as is achieved by the ePTFE fibers, enables low weight per area fabrics, easier and more efficient reshaping, and can achieve higher coverage in a woven or knitted fabric.

In at least one embodiment, the ePTFE fiber may have a substantially round configuration. As used herein, the term "substantially round" is meant to denote that the fiber has a round (e.g., circular) or nearly round configuration and an aspect ratio of about 1.

Additionally, the ePTFE fibers (pre- or post-weaving or knitting) have a tenacity greater than about 1.5 cN/dtex. In at least one embodiment of the invention, the ePTFE fibers have a tenacity from about 1.5 cN/dtex to about 7 cN/dtex, from about 2 cN/dtex to about 6 cN/dtex, or from about 2.5 cN/dtex to about 5 cN/dtex. Further, the ePTFE fibers have a fiber break strength (pre- or post-weaving or knitting) of at least about 2 N. In one or more embodiments, the ePTFE fibers have a fiber break strength from about 2 N to about 20 N, from about 3 N to about 19 N, from about 4 N to about 18 N, or from about 5 N to about 17 N.

Additionally, the fibers (pre- or post-weaving or knitting) may have a weight per length greater than about 20 dtex, greater than about 30 dtex, greater than about 40 dtex, or greater than about 50 dtex or a weight per length of about 20 dtex to about 1200 dtex, from about 30 dtex to about 1000 dtex, from about 40 dtex to about 500 dtex, from about 50 dtex to about 450 dtex, from about 100 dtex to about 400 dtex, or from about 150 dtex to about 300 dtex. It is to be appreciated that a lower dtex provides a lower weight/area fabric, which enhances the comfort of a garment formed from the fabric. In addition, the low denier of the ePTFE fiber enables the woven fabric to have a high pick resistance. Pick resistance is referred to as the ability of a fabric to resist the grasping and moving of individual fibers within the fabric. In general, the finer the fiber (e.g., lower denier or dtex) and tighter the weave, a better pick resistance is achieved.

The ePTFE fibers also have a height (thickness) (pre- or post-weaving or knitting) less than about 500 microns. In some embodiments, the thickness ranges from about 10 microns to about 500 microns, from 15 microns to about 250 microns, from about 20 microns to about 150 microns, from about 25 microns to 100 microns, from about 30 microns to 80 microns, or from about 35 microns to 50 microns. The ePTFE fibers may have a pre- or post-weaving or knitting height (thickness) less than 500 microns, less than 400 microns, less than 300 microns, less then 200 microns, less then 100 microns, or less than 50 microns. The ePTFE fibers also have a width (pre- or post-weaving or knitting) that is less than about 4.0 mm.

In at least one exemplary embodiment, the fibers have a pre- or post-weaving or knitting width from about 0.05 mm to about 4.0 mm, from about 0.1 mm to about 3.0 mm, from about 0.3 mm to about 2.0 mm, or from about 0.5 mm to about 1.5 mm. The resulting aspect ratio (i.e., width to height ratio) of the ePTFE fibers is greater than about 1. In some embodiments, the aspect ratio is greater than about 2, greater than about 5, greater than about 10, greater than about 15, greater than about 20, or greater than about 25. A high aspect ratio, such as is achieved by the ePTFE fibers, enables low weight per area fabrics, easier and more efficient reshaping, and can achieve higher coverage in a woven fabric with less picks and ends per inch.

The ePTFE fibers may have a small cross-section compared to conventional fibers. Thus, when the ePTFE fiber is woven with another fiber, the resulting woven fabric may have a topography where the ePTFE fiber is positioned below the surface of the woven fabric, and in some instances, may not be visible to the naked eye. Such a weave construction enhances the skin sensoric of the fabric when sweating or wet.

In another embodiment, the ePTFE fiber is woven with another fiber such that the ePTFE fiber is positioned near or on the surface of the woven fabric. It was discovered that such an ePTFE woven fabric had an improved beading performance over conventional, non ePTFE fabrics. The beading performance of this ePTFE woven fabric may range from about 50% to about 70%, from about 70% to about 80%, or from about 80% to about 90%. With the addition of a water repellent treatment, the beading performance of the ePTFE woven fabric is about 100%. Unlike conventional non-ePTFE fabrics, the beading performance of the woven ePTFE fabric does not degrade over time to zero %. It was determined that the beading performance did not degrade over time to an amount below the initial beading performance of the fabric. It is to be appreciated that with no water repellent treatment, the beading performance of such an ePTFE woven fabric remains at its initial beading performance over time.

The ePTFE fiber, when loosely woven with at least one other fiber, may include visible gaps between the intersections of the warp and weft fibers. As such, the fabric is highly breathable but is not water resistant. Such large gaps in the fabric may be acceptable in applications where, for example, the water resistance is to be provided by another layer or in situations where general areal coverage is desired and water resistance is not critical.

In other embodiments, the ePTFE fiber is more tightly woven with the other fiber(s), such as when the width of the ePTFE fiber exceeds the allotted space in the woven fabric based on the number of picks per inch and/or ends per inch. In such a fabric, there is no, or substantially no, gaps between the intersections of the warp and weft fibers. The width of the ePTFE fiber may be greater than 1 times, greater than about 1.5 times, greater than about 2 times, greater than about 3 times, greater than about 4 times, greater than about 4.5 times, greater than about 5 times, greater than about 5.5 times, or greater than about 6 times (or more) the space provided to the fibers based on the number of picks per inch and/or ends per inch. In other words, the ePTFE fibers may be woven tighter than the width of the ePTFE fiber. In such embodiments, the ePTFE fibers begin the weaving process in a substantially rectangular configuration. However, due to the larger size of the fiber compared to the space provided by the picks per inch and/or ends per inch, the ePTFE fibers may curl and/or fold upon themselves to conform to the weave spacing determined by the number of picks per inch and/or ends per inch of the warp and weft fibers. Generally, the folding or curling occurs in the width of the fiber such that the width of each individual fiber becomes smaller as the folding or curling of the fiber occurs. The fibers are thus in a folded configuration along a length of the fiber.

The conformability of the ePTFE fiber allows larger sized ePTFE fibers to be utilized in smaller weave spacing. Increasing the number of picks per inch and/or ends per inch compared to the width of the fiber reduces or even eliminates gaps between where the warp and weft fibers intersect. Such tightly woven fabrics are concurrently highly breathable and water resistant (e.g., have a high water entry pressure). In embodiments where the ePTFE fiber has a node and fibril structure (such as in a low density ePTFE fiber), the fabric breathes not only through whatever gap may be present but also through the ePTFE fiber itself. Thus, even when there are no gaps present, the woven fabric containing the low density ePTFE fiber remains breathable.

The ePTFE fibers described herein, along with one or more other weave fiber, may be used to form a woven fabric having warp and weft fibers interwoven with one another in a repeating weave pattern. Any weave pattern, such as, but not limited to, plain weaves, satin weaves, twill weaves, and basket weaves, may be used to form the ePTFE fibers and other fiber(s) into a woven fabric. The weave fiber may be smooth or have a textured surface. Suitable fibers for use as the weave fiber(s) include, but are not limited to cellulose (e.g., cotton, bamboo, hemp, etc.), blended cotton fibers (e.g., polymer/cotton fibers, such as, for example, polyester/cotton fiber or nylon/cotton fiber)), fire resistant cotton, nylon, wool, silk, aramid, polyamide, acrylic, olefin, blended synthetic fibers (e.g., nylon/lycra fiber) rayon, polyester, polyethylene, polypropylene, wool, silk, aramid, polyamide, acrylic, olefin, spandex, and combination and blends thereof. The weave fiber(s) may be selected depending on the desired performance properties of the woven fabric. It is to be appreciated that the inclusion of one or more elastic or otherwise stretchable fiber as the weave fiber will allow the woven fabric to stretch and then recover or substantially recover to its original shape. Non-limiting examples of elastic fibers for use in the woven fabric include elastane or nylon (e.g., textured nylon).

The ePTFE fiber may be woven as a single fiber and may be woven flat, as discussed above, or twisted prior to weaving. In addition, the ePTFE fiber may be woven as multiple ePTFE fibers where two or more ePTFE fibers are positioned adjacent to or alongside of each other and are treated as a single weaving fiber. Also, multiple ePTFE fibers may be twisted or braided together and treated as a single weaving fiber. These ePTFE fibers may be woven with one or more weave fiber to form a woven fabric.

Further, one or more weave fiber (e.g., non-PTFE fiber) may be wrapped around the ePTFE fiber (or vice versa) and woven into a fabric. In another embodiment, the ePTFE fibers may be wrapped about the weave fibers so as to encapsulate the weave fibers in a core/sheath configuration (or vice versa). The ePTFE fiber may also be twisted or braided with one or more weave fiber prior to weaving. As used herein, the term "combined" is used to refer to all combinations of fibers used as a single weaving or knit fiber, such as, for example, twisting, braiding, wrapping one or more weave fiber around the around the ePTFE fiber (or vice versa), a core-shell configuration with the ePTFE fiber being either the shell or the core, or laid side-by-side prior to weaving or knitting.

The ePTFE fiber, whether alone or in combination with a weave fiber(s), may be utilized in either the warp and/or the weft direction. It is to be appreciated that any number of variations of weave patterns where the ePTFE fiber and/or weave fiber are used in the warp and weft directions. The ePTFE fiber may be used solely in the warp or weft direction or in the warp and the weft direction and may be alternated by weave fiber(s) or the weave fiber(s) may be inserted at a predetermined interval, such as, for example, every other pick, every third pick, every fourth pick, etc. The ePTFE fiber may alternatively be present in both the warp and weft direction at predetermined intervals. As one non-limiting example, the warp fibers may be formed of polyamide fibers and the weft fibers may be formed of polyamide fibers and the ePTFE fiber in alternating picks. In another non-limiting example, the entire weft direction may be composed of ePTFE fibers and the warp fibers may be composed of polyamide fibers.

In another embodiment, the ePTFE fibers, in combination with a knit fiber, may be knit into a knit fabric. Suitable fibers for use as the knit fiber(s) include, but are not limited to rayon, polyester, polyethylene, polypropylene, cellulose (e.g., cotton, bamboo, hemp, etc.), blended cotton fibers (e.g., polymer/cotton fibers, such as, for example, polyester/cotton fiber or nylon/cotton fiber)), fire resistant cotton, nylon, wool, silk, aramid, polyamide, acrylic, olefin, a blended synthetic fiber (e.g., nylon/lycra fiber) fire resistant cotton, nylon, wool, silk, aramid, polyamide, acrylic, olefin, spandex, a blended polymer fiber (e.g., nylon/lycra fiber), and combination and blends thereof. As discussed above, the non-ePTFE fiber(s) may be selected depending on the desired performance properties of the knit fabric. It is to be appreciated that the inclusion of one or more elastic or otherwise stretchable fiber as the knit fiber will allow the knit fabric to stretch and then recover or substantially recover to its original shape. Non-limiting examples of elastic or stretchable fibers for use in the knit fabric include elastane or nylon (e.g., textured nylon).

The ePTFE fiber, together with the knit fiber, may be knit utilizing any knit pattern, such as, but not limited to, warp knits, weft knits, circular knits, plain knits, fleece knits, fuzzy knits, waffle knits, jersey knits, and an intimate blend knit. The ePTFE fiber may be positioned adjacent to or alongside the non-ePTFE fiber and treated as a single knit fiber. Alternatively, the knit fiber may be wrapped around the ePTFE fiber (or vice versa) and knit into a knitted fabric. In another embodiment, the ePTFE fibers and non-ePTFE fibers may be twisted or braided together and treated as a single knit fiber. In a further embodiment, the ePTFE fibers may be wrapped about the non-ePTFE fibers so as to encapsulate the non-ePTFE fiber in a core/sheath configuration (or vice versa). Additionally, the ePTFE fiber may be combined with one or more non-PTFE fibers. As discussed above, the term "combined" is used to refer to all combinations of fibers used as a single weaving or knit fiber, such as, for example, twisting, braiding, wrapping one or more weave fiber around the around the ePTFE fiber (or vice versa), a core-shell configuration with the ePTFE fiber being either the shell or the core, or laid side-by-side.

In some embodiments, it may be desirable to impart flame resistance to the woven or knit fabric. In such an embodiment, a fire retarding or flame resistant fiber may be employed as at least one of the weave or knit fibers. Non-limiting examples of aramids, flame resistant cottons, fire resistant cottons, fire resistant cellulosic fibers (e.g., fire resistant cotton fibers), polybenzimidazole (PBI), polybenzoxazole (PBO), flame resistant rayon, modacrylic blends, carbon, fiberglass, polyacrylonitrile (PAN), Nomex®, and combinations and blends thereof. The ePTFE fabric exhibits no vertical flame or melt or drip characteristics when tested in accordance with the Vertical Flame Test described herein.

The ePTFE fibers restrict the entry of water into the fiber structure, thus eliminating problems associated with conventional woven fabrics that absorb water, which, in turn, makes the fabrics heavier, and permits for thermal conductivity of the temperature of the water through the fabric. Such thermal conductivity may be detrimental in cases where the wearer is in a cold environment and the cold is transported to the body of the wearer. In addition, the less water that is picked up by the fabric reduces the amount of time needed for the fabric to dry. As used herein, the term "dry" is meant to denote dry weight at standard conditions (i.e., 65±2% relative humidity (RH) and 21±1° C. (70±2° F.)). In many environments, it is desirable to have the garment dry as quickly as possible. The ePTFE fabric exhibits a dry time of less than 30 min, less than 25 min, or less than 20 min.

Further, without a hydrophobic treatment imparted to the fabric, woven fabrics exhibits a vertical wicking of greater than 90 mm in 10 mins, greater than 100 mm in 10 mins, or greater than 110 mm in 10 mins. Knit fabrics exhibit a vertical wicking of greater than 10 mm in 10 mins. A fabric with a high amount of wicking is especially desirable in hot, humid conditions where an individual perspires. Wicking permits the perspiration to enter the woven or knit fabric and away from the skin, thereby enhancing the comfort of the wearer of the garment. It is desirable that the fabric have both a high vertical wicking to move the water away from the skin and fast dry time to remove the water from the fabric itself. Although these features are competing factors, the ePTFE woven and knit fabrics achieve both high wicking (e.g., greater than or equal to about 90 mins) and a fast dry time (e.g., less than 30 minutes).

The ePTFE woven and knit fabrics have a moisture vapor transmission rate (MVTR) that is greater than about 3000 $g/m^2/24$ hours, greater than about 5000 $g/m^2/24$ hours, greater than about 8000 $g/m^2/24$ hours, greater than about 10000 $g/m^2/24$ hours, greater than about 12000 $g/m^2/24$ hours, greater than about 15000 $g/m^2/24$ hours, greater than about 20000 $g/m^2/24$ hours, or greater than about 25000 $g/m^2/24$ hours when tested according to the moisture vapor transmission rate (MVTR) Test Method described herein. As used herein, the term "breathable" or "breathability" refers to woven fabrics or laminates that have a moisture vapor transmission rate (MVTR) of at least about 3000 grams/$m^2$/24 hours. Moisture vapor transmission, or breathability, provides cooling to a wearer of a garment, for example, made from the fabric.

The woven and knit fabrics also have an air permeability that is less than about 1000 cfm, less than about 500 cfm, less than about 300 cfm, less than 100 cfm, less than about 70 cfm, less than about 50 cfm, less than about 25 cfm, less than about 20 cfm, less than about 15 cfm, less than about 10 cfm, less than about 5 cfm, and even less than about 3 cfm. It is to be understood that low air permeability correlates to improved windproofness of the fabric. It is to be noted that air permeability may be an enhanceable feature, especially in knits where air permeability may be desired.

Additionally, the woven and knit fabrics are lightweight, which permits the end user to easily carry and/or transport articles formed from the woven fabrics. The woven fabrics may have a weight per unit area of less than about 1000 $g/m^2$, less than about 500 $g/m^2$, less than about 400 $g/m^2$, less than about 300 $g/m^2$, less than about 200 $g/m^2$, less than about 150 $g/m^2$, or less than about 100 $g/m^2$. The light weight contributes to the overall comfort of the wearer of the garment, especially during movement of the wearer as the wearer experiences less restriction to movement.

Further, when utilizing monofilament ePTFE, it was surprising to find the woven and knit fabrics have a soft hand and are drapable, making them suitable for use in garments. The fabrics have an average stiffness less than about 1000 g, less than about 500 g, less than about 400 g, less than about 300 g, less than about 250 g, less than about 200 g, less than about 150 g, less than about 100 g, and even less than about 50 g. It was surprisingly discovered that in addition to a soft hand, the woven fabrics demonstrated a reduction in noise associated with bending or folding the woven fabric. It was further discovered that even with the addition of a porous polymer membrane, as discussed hereafter, the noise was reduced, particularly when compared to conventional ePTFE laminates.

The woven and knit fabrics are also resistant to tearing. For example, the woven fabric has a tear strength from about 10 N to about 200 N (or even greater), from about 15 N to about 150 N, or from about 20 N to about 100 N as measured by the Elemendorf Tear test described herein. It was discovered that the ePTFE fabrics had an improved tear strength over conventional, non ePTFE fabrics, ePTFE blended woven fabrics described herein also have a break strength from about 100 N to about 1500 N (or even greater), from about 300 N to about 1000 N, or from about 500 N to about 750 N as measured by the Fabric Break Strength test set forth herein. Such high tear strengths and break strengths enable the woven fabric to be more durable in use.

Treatments may be provided to impart one or more desired functionality, such as, but not limited to, oleophobicity to the fabrics. Coatings or treatments, such as a fluoroacrylate coating, may be applied to one or both sides of the woven or knit fabric, and may penetrate through or only partially through the woven or knit fabric. It is to be understood that any functional protective layer, functional coating, or functional membrane, such as, but not limited to, polyamides, polyesters, polyurethanes, cellophane, non-fluoropolymer membranes that are both waterproof and breathable may be attached or otherwise affixed or layered on the woven or knit fabric. Additionally, a textile such as a woven, non-woven, or knit may be attached to the functional protective layer, functional coating, or functional membrane.

The fabrics may be colored by a suitable colorant composition. In one embodiment, the ePTFE fiber has a microstructure where the pores of the ePTFE fiber are sufficiently tight so as to provide water resistance and sufficiently open to provide properties such as moisture vapor transmission and penetration by coatings of colorants. In one embodiment, the ePTFE fiber has a surface that, when printed, provides a durable aesthetic. Aesthetic durability can be achieved in some embodiments with colorant coating compositions that comprise a pigment having a particle size that is sufficiently small to fit within the pores of the ePTFE fiber and/or within the woven fabric. Multiple colors may be applied using multiple pigments, by varying the concentrations of one or more pigments, or by a combination of these techniques. Additionally, the coating composition may be applied in any form, such as a solid, pattern, or print. A coating composition can be applied to the woven or knit fabric by conventional printing methods. Application methods for colorizing include but are not limited to, transfer coating, screen printing, gravure printing, ink-jet printing, and knife coating. In some embodiments, the ePTFE fiber remains uncolored while the weave fiber(s) in the woven fabric are colored by the colorant composition. Other coatings or treatments may be applied, such as, for example, to make the fabric UV stable, anti-microbial, anti-fungal, contamination resistant, etc.

In at least one embodiment, a porous or microporous polymer membrane is laminated or bonded to the woven or knit fabric. Non-limiting examples of porous membranes including expanded PTFE, expanded modified PTFE, expanded copolymers of PTFE, fluorinated ethylene propylene (FEP), and perfluoroalkoxy copolymer resin (PFA). Polymeric materials such as polyolefins (e.g., polypropylene and polyethylene), polyurethanes, and polyesters are considered to be within the purview of the invention provided that the polymeric material can be processed to form porous or microporous membrane structures. It is to be appreciated that even when the inventive woven fabric is laminated or bonded to a porous or microporous membrane, the resulting laminate remains highly breathable and substantially maintains the breathability of the woven fabric. In other words, the porous or microporous membrane laminated to the woven fabric does not affect, or only minimally affects, the breathability of the woven or knit fabric, even when laminated.

The microporous membrane may be an asymmetric membrane. As used herein, "asymmetric" is meant to indicate that the membrane structure includes multiple layers of ePTFE within the membrane where at least one layer within the membrane has a microstructure that is different from the microstructure of a second layer within the membrane. The difference between the first microstructure and the second microstructure may be caused by, for example, a difference in pore size, a difference in node and/or fibril geometry or size, and/or a difference in density.

In a further embodiment, a textile may be attached to the microporous membrane or directly to the ePTFE fabric. As used herein, the term "textile" is meant to denote any woven, nonwoven, felt, fleece, or knit and can be composed of natural and/or synthetic fiber materials and/or other fibers or flocking materials. For example, the textile may be comprised of materials such as, but not limited to cotton, rayon, nylon, polyester, and blends thereof. The weight of the material forming the textile is not particularly limited except as required by the application. In exemplary embodiments, the textile is air permeable and breathable.

Any suitable process for joining the membrane and/or the textile to the woven or knit fabric (and textile to the membrane) may be used, such as gravure lamination, fusion bonding, spray adhesive bonding, and the like. The adhesive may be applied discontinuously or continuously, provided that breathability through the laminate is maintained. For example, the adhesive may be applied in the form of discontinuous attachments, such as by discrete dots or grid pattern, or in the form of an adhesive web to adhere layers of the laminate together.

The ePTFE woven and knit fabrics are suitable for use in various applications, including but not limited to garments, tents, covers, bivy bags, footwear, gloves, and the like. The fabrics are concurrently highly breathable, highly durable, lightweight, and fast drying. The ePTFE fiber may be woven as a single fiber, as part of a multifilament fiber, or may be twisted or braided with another fiber to form a woven or knit fabric. The ePTFE fabrics can be used alone, or it can be used in conjunction with a fluoropolymer membrane and/or textile. The surface of the ePTFE fabrics can be colorized, for example, by printing.

Although the present disclosure relates generally herein to ePTFE fibers, it is to be appreciated that non-ePTFE fibers such as, but not limited to, polyether ether ketone (PEEK), poly(vinylidene fluoride) (PVDF), polyphenylene sulfide (PPS), high molecular weight polyethylene, polyethylene, polyamide, polyimide, polyolefin, and polyester fibers may be utilized alone, or in conjunction with another fiber, to form a woven or knit fabric. For instance, PEEK, PVDF, and PPS fibers are monofilament fibers and may have a substantially rectangular or substantially round (circular) configuration. A substantially round PVDF fiber, for example, when woven or knit into a fabric, advantageously picks up little to no water into the fiber, and subsequently, little or no water into the fabric. The non-ePTFE fibers may be woven or knit in conjunction with other non-ePTFE fibers or with monofilament PTFE fibers to form woven or knit fabrics.

In a further embodiment, a monofilament PTFE fiber having a substantially round (e.g., aspect ratio of about 1) or a substantially rectangular configuration (e.g., aspect ratio greater than about 1) may be woven or knit, alone or in conjunction with another fiber (e.g., at least one non-ePTFE fiber) to form a fabric. Such fabrics are considered to be within the purview of the invention and may be used in the same manner as the other woven and knit fabrics described herein.

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

Test Methods

It should be understood that although certain methods and equipment are described below, other methods or equipment determined suitable by one of ordinary skill in the art may be alternatively utilized.

Fiber Weight Per Length

A 45 meter length of fiber was obtained using a skein reel. The 45 meter length was then weighed on a scale with precision to 0.0001 grams. This weight was then multiplied by 200 to give the weight per length in terms of denier (g/9000 m). Three measurements were taken and averaged.

Fiber Width

Fiber width was measured in a conventional manner utilizing a 10× eye loop having gradations to the nearest 0.1 mm. Three measurements were taken and averaged to determine the width to the nearest 0.05 mm.

Fiber Thickness

Fiber thickness was measured utilizing a snap gauge accurate to the nearest 0.0001 inch. Care was taken to not to compress the fibers with the snap gauge. Three measurements were taken and averaged and then converted to the nearest 0.0001 mm.

Fiber Density

Fiber density was calculated utilizing the previously measured fiber weight per length, fiber width and fiber thickness using the following formula:

$$\text{Fiber Density (g/cm}^3\text{)} = \frac{\text{Fiber wt per length dtex}}{\text{Fiber Width (mm)} * \text{Fiber Thickness (mm)} * 10{,}000}$$

Fiber Break Strength

The fiber break strength was the measurement of the maximum load needed to break (rupture) the fiber. The break strength was measured by a tensile tester, such as an Instron Machine of Canton, Mass. The Instron® machine was outfitted with fiber (horn type) jaws that are suitable for securing fibers and strand goods during the measurement of tensile loading. The cross-head speed of the tensile tester was 25.4 cm per minute. The gauge length was 25.4 cm. Five measurements of each fiber type were taken with the average reported in units of Newtons.

Fiber Tenacity

Fiber tenacity is the break strength of the fiber normalized to the weight per length of the fiber. Fiber tenacity was calculated using the following formula:

$$\text{Fiber tenacity (cN/dtex)} = \frac{\text{Fiber break strength } (N) * 100}{\text{Fiber weight per length (dtex)}}$$

Mass/Area

In order to measure mass per area, fabric samples were prepared having an area of at least 100 cm². A Karl Schroder 100 cm² circle cutter may be used. Each sample was weighed using a Mettler Toledo Scale Model AB204. The scale was recalibrated prior to weighing specimens, and the results were reported in grams per square meter (g/m³). Three samples were taken per specimen and the average was reported.

SEM Sample Preparation Method

Cross-section SEM samples were prepared by spraying them with liquid nitrogen and then cutting the sprayed samples with a diamond knife in a Leica ultracut UCT, available from Leica Microsystems, Wetzlar, Germany.

Fabric Tear Strength

This test is designed to determine the average force required to propagate a single-rip tongue-type tear starting from a cut in woven fabric. A Thwing-Albert Heavy Duty Elmendorf Tearing Tester (MA1227) was used. The instrument was calibrated and the correct pendulum weight was selected. The pendulum was raised to the starting position. The specimen was placed in jaws and clamped. The specimen was centered with the bottom edge carefully against the stops. The upper area of the specimen was directed towards the pendulum to ensure a shearing action. The test was performed until a complete tear was achieved. The digital readout was recorded in Newtons. This was repeated until a set (3 warp and 3 weft) was completed. The reported results are the average of the measurements for each the warp and weft direction.

Fabric Break Strength

This test was performed in accordance with the general teachings of ASTM D 751. 5 warp and 5 fill specimens with dimensions as 4'×6' were cut, with the long dimension parallel to the test direction. The specimens were conditioned at 70±2° F., 65±2% RH prior to testing for at least 1 hour. Next, a template of 1.5"×6" was obtained and aligned with the 6" edge of the sample. A thin guideline was drawn (at the 1.5" side) along the fabric down the full length of the specimen. This line must be as accurate as possible and parallel to the lengthwise fibers. The intent of these lines is to ensure that the center portion of the specimen is tested and that the specimen is properly aligned with the jaws for the warp and fill fibers. This is important in order to obtain the true specimen performance. An Instron Model 5565 was calibrated and a 1000 lb. load cell was installed. The 1"×1" rubber jaws were placed on the same side of the top and bottom grips and the 1"×3" rubber jaws were placed on the other side of the top and bottom grips (the 1"×1" jaw should clamp to a 1"×3" jaw). The gage length was set to 3". The specimen was placed between the open jaws, aligning the reference line with the outer edge of both the top and the bottom 1"×1" jaws. The top jaw was closed by using a pneumatic foot pedal. The specimen was allowed to hang freely and the bottom jaw was closed by pushing down another click on the foot pedal. The load cell was balanced. Then, the test was started by pressing start on the control panel. If slippage of the specimen in the jaws was observed, the data was disregarded and re-cut and retested. If specimen breaks in the jaw were observed, the data was disregarded and re-cut and retested. If breaks at the edge of the jaw were observed, it was checked to see if the majority of specimen breaks are near the edge of the jaw because the jaws are preventing the specimen from contracting in width as the force is applied; if so then, "jaw breaks" are a characteristic of the material and no retests are necessary. These steps were repeated 5 times for each of the warp and fill specimens and the average maximum force at break was reported for each direction.

Fabric Stiffness

A Thwing Albert Handle-O-Meter with a 1000 g beam and ¼" slot width was used to measure the hand (stiffness). A 4"×4" sample was cut from the fabric. The specimen was placed face up on the specimen platform. The specimen was lined up so that the test direction was perpendicular to the slot to test the warp direction. The START/Test button was pressed until a click is heard, then released. The number appearing on the digital display after a second click is heard was recorded. The reading does not return to zero, it indicates the peak reading of each individual test. The specimen was turned over and tested again, recording the number. Then the specimen was turned 90 degrees to test the fill direction, recording the number. Finally, the specimen was turned over and tested again, recording the number. The 4 recorded numbers were added together (1 Warp Face, 1 Warp Back, 1 Fill face, 1 Fill Back) to calculate the overall stiffness of the specimen in grams. The results were reported for one sample.

Air Permeability—Frazier Number Method

Air permeability was measured by clamping a test sample in a gasketed flanged fixture which provided a circular area of approximately 6 square inches (2.75 inches diameter) for air flow measurement. The upstream side of the sample fixture was connected to a flow meter in line with a source of dry compressed air. The downstream side of the sample fixture was open to the atmosphere.

Testing was accomplished by applying a pressure of 0.5 inches of water to the upstream side of the sample and recording the flow rate of the air passing through the in-line flowmeter (a ball-float rotameter).

The sample was conditioned at 70° F. (21.1° C.) and 65% relative humidity for at least 4 hours prior to testing.

Results were reported in terms of Frazier Number which is air flow in cubic feet/minute/square foot of sample at 0.5 inches water pressure. N=3.

Moisture Vapor Transmission Rate Test—(MVTR)

The MVTR for each sample fabric was determined in accordance with the general teachings of ISO 15496 except that the sample water vapor transmission (WVP) was converted into MVTR moisture vapor transmission rate (MVTR) based on the apparatus water vapor transmission (WVPapp) and using the following conversion.

$$\text{MVTR} = (\text{Delta } P \text{ value} \ast 24)/((1/\text{WVP}) + (1 + \text{WVPapp value}))$$

To ensure comparable results, the specimens were conditioned at 73.4±0.4° F. and 50±2% rH for 2 hrs prior to testing and the bath water was a constant 73.4° F.±0.4° F.

The MVTR for each sample was measured once, and the results are reported as g/m²/24 hours.

Vertical Wicking

One 500 ml Erlemeyer flasks was filled with 200 ml of water colored with any color of suitable to make water level visible on the sample. Two 6"×1" strips (the 6' length is cut in the warp direction) were cut from the sample fabric. The top edge of the strip (approximately ⅛'-¼' from top) was pierced with a long straight pin (the pin shall be parallel with the 1" edge. The strip was suspended from the pin in the flask filled with 200 ml of colored water (the pin rested on the edges of the flask opening). After 10 minutes, the strip was removed from the flask and the water level was measured on the strip (in mm) and recorded. This procedure was used to determine the rate at which water wicks test samples suspended in water. N=2

Vertical Wicking (Warp Direction):

One 500 ml Erlemeyer flasks was filled with 200 ml of water colored with any color of suitable to make water level visible on the sample. Two 6"×1" strips (the 6" length is cut in the warp direction) were cut from the sample fabric. The top edge of the strip (approximately 1/8"-1/4" from top) was pierced with a long straight pin (the pin shall be parallel with the 1" edge. The strip was suspended from the pin in the flask filled with 200 ml of colored water (the pin rested on the edges of the flask opening). After 10 minutes, the strip was removed from the flask and the water level was measured on the strip (in mm) and recorded. This procedure was used to determine the rate at which water wicks test samples suspended in water. N=2

Vertical Wicking (Weft Direction):

One 500 ml Erlemeyer flasks was filled with 200 ml of water colored with any color of suitable to make water level visible on the sample. Two 6"×1" strips (the 6" length is cut in the weft direction) were cut from the sample fabric. The top edge of the strip (approximately 1/8'-1/4" from top) was pierced with a long straight pin (the pin shall be parallel with the 1' edge. The strip was suspended from the pin in the flask filled with 200 ml of colored water (the pin rested on the edges of the flask opening). After 10 minutes, the strip was removed from the flask and the water level was measured on the strip (in mm) and recorded. This procedure was used to determine the rate at which water wicks test samples suspended in water. N=2

Thermal Shrinkage

The procedure was followed according to NFPA 1971 Standard on Protective Ensembles for Structural Fire Fighting and Proximity Fire Fighting, 2013. A specimen size of 15" by 15" was cut. The long dimension of an AATCC Shrinkage ruler was run parallel to the warp direction of the specimen. 10" benchmarks were marked on the specimen. Each mark was at least 2" from any specimen edge. The fill dimensions were also marked in a similar manner with the long dimension of the AATCC Shrinkage ruler. A thermal oven large enough to fit the sample was set to 260 C. and allowed to heat to temperature. During this time, the specimen was conditioned at 70±2° F., 65±2% RH prior to shrinkage evaluation.

The specimen was then prepared by placing binder clips 12" apart on the top corners of the specimen with the warp direction in vertical position. Specimens were then hooked onto a rack that could be inserted into the oven. After the oven was at temperature and samples were ready, the oven door was opened and the pre-assembled sample rack was slid into oven, and the door was closed. The sample was exposed to heat for 10 minutes. After the exposure, the sample was removed, unclipped from the rack, and re-measured with the AATCC Shrinkage ruler in both the warp and fill direction. The data was recorded as a "+" (implied growth) and a "−" (implied shrinkage) percent change to the nearest 0.25%. N=3

Weight Gain and Drying Time

Fabric samples and blotting paper were conditioned at 65±2% RH and 21±1° C. (70±2° F.) for a minimum of four hours before testing. Three specimens were taken from each sample, with each specimen consisted of a 2"×2" piece cut. The conditioned specimen was weighed using a laboratory balance, accurate to 0.1 g. 100 ml of distilled water was placed into a 250 ml beaker.

One specimen was submerged in the beaker for 30 minutes, making certain that the specimen was completely submerged under the water to ensure complete wetting. The specimen was removed and sandwiched between two pieces of unused blotter paper and passed through wringer. The piece was left sandwiched in the wet blotters. This process was repeated for the remaining two specimens of the same sample. The blotted specimens were weighed one at a time and the weight was recorded as wet weight. The weight gain for the fabric is considered to be the dry weight subtracted from the wet weight. The recorded weight gain is the average of the three specimens.

Each sample was hung separately to dry in a location that is in conditions of 65±2% RH and 21±1° C. (70±2° F.). One sample was weighed to the nearest 0.1 g every 5 minutes recording each weight, until completely dry. This was repeated until all of the specimens returned to their original dry weight. At this time the overall drying time was calculated by averaging the dry time of all three specimens.

The wringer (household laundry type) was equipped with soft rubber squeeze rolls 5.1-6.4 cm in diameter and 28.0-30.5 cm in length, with a hardness of 70-80 when measured using the Durometer tester. The wringer should be constructed so that the pressure on the top of the piece of fabric is maintained by a dead weight or lever system such that the total pressure (resulting from the total of the dead weight or lever system and the weight of the roller) was 27.2±0.5 kg. It should be power-driven at a constant rate so that the piece of fabric passed through the rolls at a rate of 2.5 cm/s. The diameters of the squeeze rolls should be measured with a pair of calipers or with a suitable micrometer. Measurements should be made at five different locations along the length of each roll, and the average of these measurements taken as the diameter of the roll. The load applied by the dead weight or lever system should be measured using a spring scale or balance, and suspending the top roll of the wringer from the scale by means of two tapes of equal length. The tapes should be placed between the rolls near their ends and should be provided with a means of holding them sufficiently far apart so that there is no contact between the tapes and the top structural member of the wringer and loading system. The spring scale or balance should be suspended from a suitable rigid support and provided with a turnbuckle or other device for adjusting the height of the scale. The usual precautions concerning the zero correction of spring scales should be observed. The turnbuckle or other device should then be adjusted to place the weight of the top roll and its weighting system on the spring scale or balance, and the system should be considered to be in equilibrium when the top roll of the wringer had been lifted just sufficiently from the bottom roll to permit vision between the bottoms of the tapes and the top of the bottom roll. At this point, the dead weight on the loading system should be adjusted until the spring scale or balance indicates a load of 27.7±0.5 kg. The calibration of the spring scale or balance should be certified by the use of known certified dead weights of 24.95, 27.22, and 29.48 kg±0.23 kg total weight. The spring scale should be accurate to within ±0.2268 kg at each of the three verification loads. The linear speed of the rolls should be measured by feeding a thin steel tape through the rolls. The steel tapes should be at least 150 cm long and should be accurate to within 3 mm per 150 cm. The time required for exactly 150 cm of this tape to pass through the nip of the rolls should be measured in seconds to the nearest second with a stopwatch calibrated in intervals of not more than 0.5 s. The speed of the rolls should be adjusted until the time required for 150 cm of tape to pass through the nip of the roll is 60±2 s. N=3

Vertical Flame

This test was performed in accordance with the general teachings of ASTM D6413. The testing apparatus was a cabinet including an SDL ATLAS M233M Burner. 5 warp and 5 fill specimens were cut per sample, with size 3"×12" with the 12" length parallel to the test direction. The specimens were conditioned at 70±2° F., 65±2% RH prior to testing for at least 1 hour. The ignition timer was set to 12 seconds, and the flame ignition timer set to 120 seconds. The specimen was placed with the metal specimen holder and clamped with clips at two places on each side (4 clamps total) making sure the specimen is smooth and flat in the holder. The flame/fan knob was turned to off. The pilot light was lit with a butane lighter. The holder was positioned in the groove of the holder rest at the back of the cabinet so that the middle of the lower edge of the specimen is centered ¾" above the burner. The cabinet door and the hood were closed fully. The specimen was tested as soon as possible (within 20 seconds of being placed above a lit pilot light.) The flame/fan knob was turned to "flame" to start the 12-second flame. The after-flame and the presence of melting or dripping after the 12-second flame extinguishes was recorded.

After-Flame:

Using a stop watch, the number of seconds, to the nearest 0.1 seconds, that the material continued to burn after the solenoid valve clicks off (extinguishing the ignition flame) was recorded. Do not turn the fan on until the specimen has stopped glowing, regardless of whether or not the after-glow is being measured.

Melt/Drip:

Look for signs of melting or dripping. The exhaust fan was turned on by turning the flame/fan knob to "fan". The door release button was depressed and allowed the cabinet to ventilate for 30 seconds or until all the smoke and fumes were removed. The fan was left on and the hood open after the ventilation period. The specimen holder was removed from the cabinet and kept inside the hood. The specimen was removed from the holder and examined for additional signs of melting and dripping. The melt/drip result was recorded as pass/fail.

This process was repeated for each sample and the average data for each direction was reported. N=5 Warp, 5 Weft Water Repellency This test was performed in accordance to AATCC 22. An 8'×8" specimen was placed securely in a 6' hoop with the face side up so that the specimen surface is uniformly smooth and wrinkle-free. The hoop was placed on the test stand of the spray tester, centering the specimen beneath the spray nozzle, with the warp yarns running along the vertical direction.

250 ml of distilled water (80±2° F.) was measured into a graduated cylinder. The water was pour into the funnel of the spray tester taking care not to touch or move the funnel. The water was allowed to spray onto the specimen. The hoop was removed and the edge was tapped against a solid edge with the tested (wet) side down. The hoop was rotated 180° and the opposite edge of the hoop was firmly tapped against a solid edge, with the tested (wet) side down. The wet or spotted pattern on the sample was immediately compared to the AATCC Standard Spray Test Rating Chart. A rating was assigned corresponding to the nearest standard rating using both the standard spray test rating photos and written descriptions. N=3. The average spray rating was reported.

EXAMPLES

Example 1a

A fine powder PTFE resin (Teflon 669 X, commercially available from E.I. du Pont de Nemours, Inc., Wilmington, Del.) was obtained. The resin was blended with Isopar K in the ratio of 0.184 g/g by weight of powder. The lubricated powder was compressed in a cylinder and allowed to dwell at room temperature for 18 hours. The pellet was then ram extruded at a 169 to one reduction ratio to produce a tape of approximately 0.64 mm thick. The extruded tape was subsequently compressed to a thickness of 0.25 mm. The compressed tape was then stretched in the longitudinal direction between two banks of rolls. The speed ratio between the second bank of rolls and the first bank of rolls, hence the stretch ratio was 1.4:1 with a stretch rate of 30%/sec. The stretched tape was then restrained and dried at 200° C. The dry tape was then expanded between banks of heated rolls in a heated chamber at a temperature of 300° C. to a ratio of 1.02:1 at a stretch rate of 0.2%/sec, followed by an additional expansion ratio of 1.75:1 at a stretch rate of 46%/sec. followed by yet an additional expansion ratio of 1.02:1 at a stretch rate of 0.5%/sec. This process produced a tape with a thickness of 0.24 mm.

This tape was then slit to create a cross-section of 3.30 mm wide by 0.24 mm thick and having a weight per length of 6162 dtex. The slit tape was then expanded across a heated plate set to 390° C. at a stretch ratio of 6.00:1 with a stretch rate of 70%/sec. This was followed by another expansion across a heated plate set to 390° C. at a stretch ratio of 2.50:1 with a stretch rate of 74%/sec. This was followed by a further expansion across a heated plate set to 390° C. at a stretch ratio of 1.30:1 with a stretch rate of 26%/sec. This was followed by running across a heated plate set to 390° C. at a stretch ratio of 1.00:1 for a duration of 1.4 seconds, resulting in an amorphously locked expanded PTFE fiber.

Figure 1:
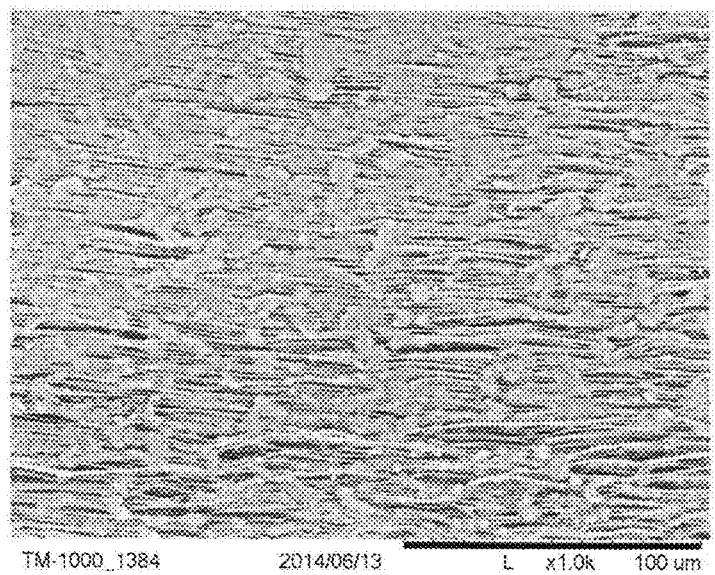
FIG. 1 is a scanning electron micrograph (SEM) of the top surface of an ePTFE fiber taken at 1000× magnification according to one exemplary embodiment of the invention.

The amorphously locked ePTFE fiber measured 316 dtex and had a rectangular cross-section and possessed the following properties: width=1.8 mm, height=0.0381 mm, density=0.46 g/cm3, break strength of 6.36 N, tenacity of 2.02 cN/dtex. A scanning electron micrograph of the fiber surface taken at 1000× magnification is shown in FIG. 1.

Figure 2:
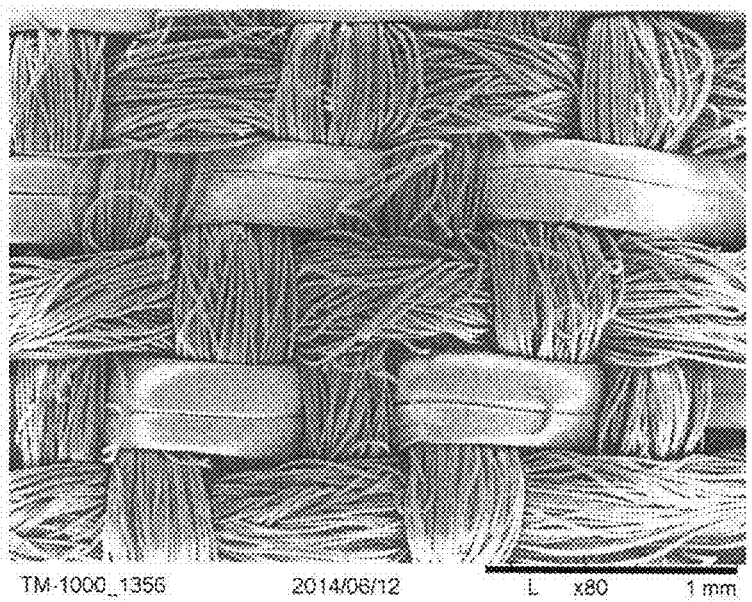
FIG. 2 is scanning electron micrograph of the top surface of a 1×2 woven twill fabric with the fiber depicted in FIG. 1 inserted at every other weft pick taken at 80× magnification according to one embodiment of the invention.
Figure 3:
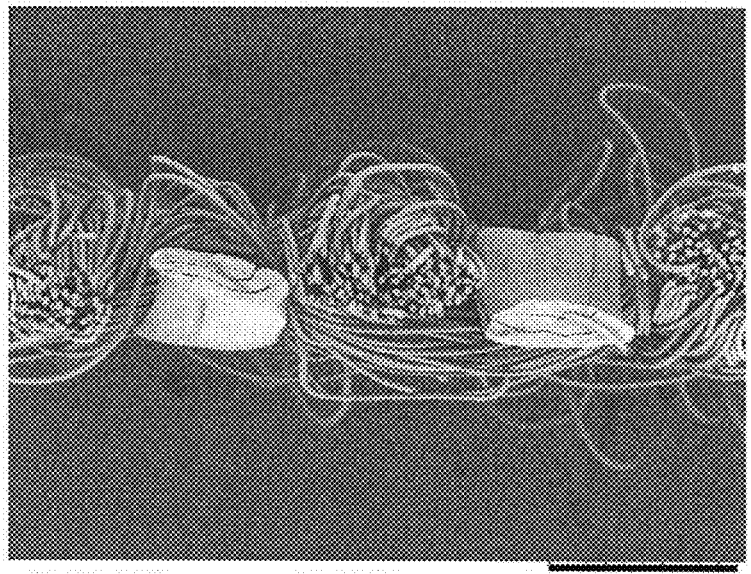
FIG. 3 is a scanning electron micrograph of a cross-section of the woven fabric depicted in FIG. 2 taken at 120× magnification according to one embodiment of the invention.

The fiber was woven to comprise a fabric blend of a 4/70/34 (ply/denier/filaments) polyamide AJT fiber (Premier Fibers, Inc., Ansonville, S.C.) and the ePTFE fiber. The obtained 4/70/34 polyamide fiber measured 358 dtex and possessed the following properties: break strength=15.03 N, tenacity=4.21 cN/dtex. The ePTFE fiber was not twisted before weaving. The weave pattern was a 2×1 twill weave and had a thread count of 54×50 threads/inch (21.2×19.7 threads/cm, Warp×Fill). The warp fibers were comprised of the polyamide fibers and the fill fibers were comprised of the polyamide fiber and the ePTFE fiber in alternating picks. The woven fabric was comprised of 18% ePTFE and 82% polyamide by weight. The woven fabric was dyed and printed for an acceptable visible appearance, with the color being applied to the polyamide fibers (i.e., the ePTFE did not become colorized). The woven fabric had the following properties: air permeability=58 cfm, dry time=20 minutes, vertical wicking=105 mm in 10 minutes, hand=160 g, break strength=1.36 kN (w)×0.90 kN (f), tear strength=125 N (w)×85 N (f). A scanning electron micrograph of the woven fabric taken at 80× magnification is shown in FIG. 2. A scanning electron micrograph of a cross-section view of the fabric taken at 120× magnification is shown in FIG. 3. The fabric had a weight of 183 g/m2.

Example 1b

Figure 4:
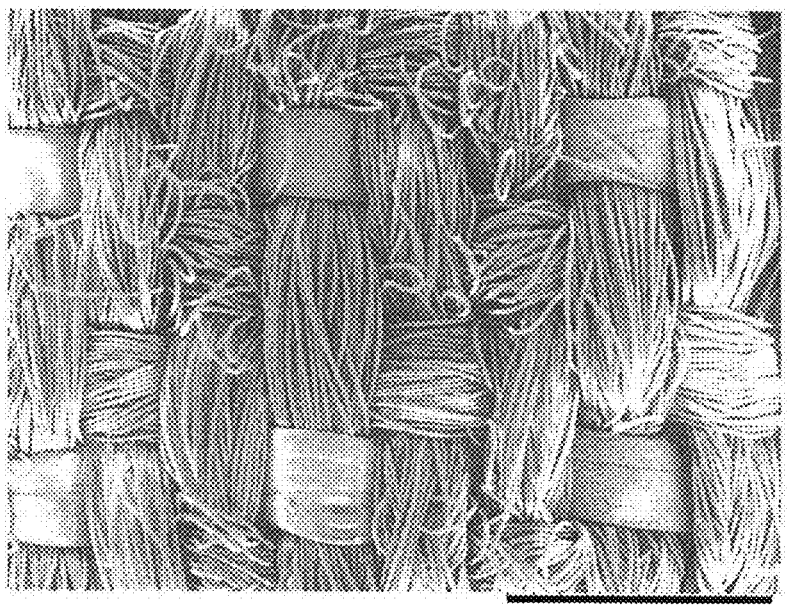
FIG. 4 is scanning electron micrograph of the top surface of a 1×2 woven twill fabric with the fiber depicted in FIG. 1 inserted at every third weft pick taken at 80× magnification in accordance with one exemplary embodiment of the invention.
Figure 5:
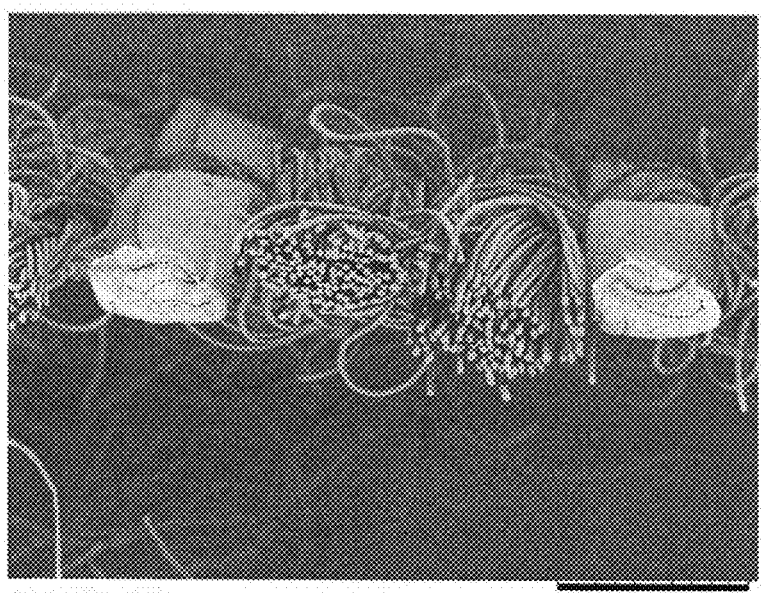
FIG. 5 is a scanning electron micrograph of a cross-section of the woven fabric depicted in FIG. 4 taken at 120× magnification according to one embodiment of the invention.

A woven fabric was constructed in the same manner as described in Example 1a with the exception that the ePTFE was inserted in every third pick in the fill direction of the weave. The ePTFE fiber was not twisted before being woven. The woven fabric was comprised of 12% ePTFE and 88% polyamide by weight. The woven fabric was dyed and printed for an acceptable visible appearance, with the color being applied to the polyamide fibers. The woven fabric had the following properties: air permeability=48 cfm, dry time=25 minutes, vertical wicking=105 mm in 10 minutes, hand=179 g, break strength=1.37 kN (w)×1.05 kN (f), tear strength=120 N (w)×85 N (f). A scanning electron micrograph of the woven fabric taken at 80× magnification is shown in FIG. 4. A scanning electron micrograph of a cross-section view of the fabric taken at 120× magnification is shown in FIG. 5. The fabric had a weight of 190 g/m2.

Comparative Example 1c

Figure 6:
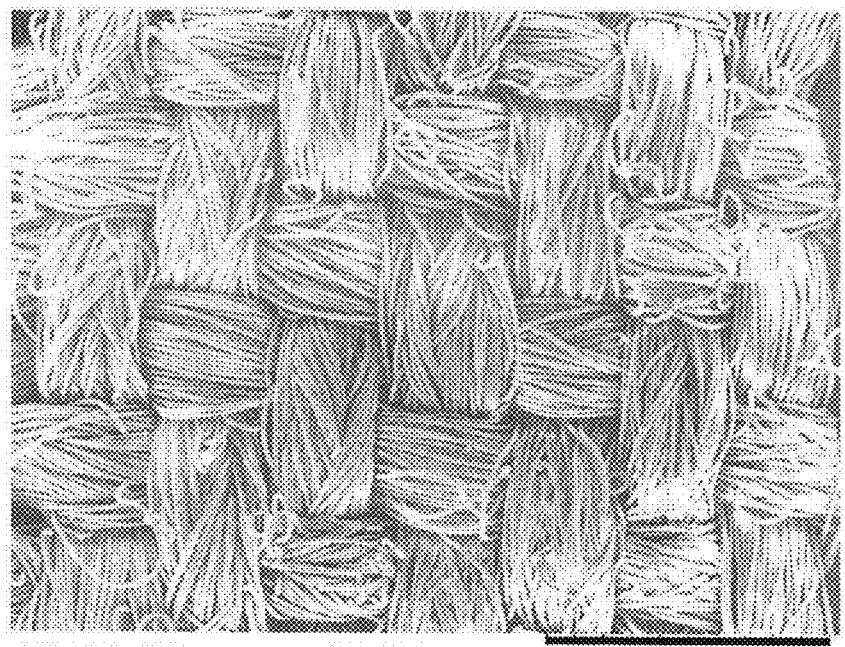
FIG. 6 is scanning electron micrograph of the top surface of a 1×2 woven twill fabric of polyamide fibers taken at 80× magnification according to at least one exemplary embodiment of the invention.
Figure 7:
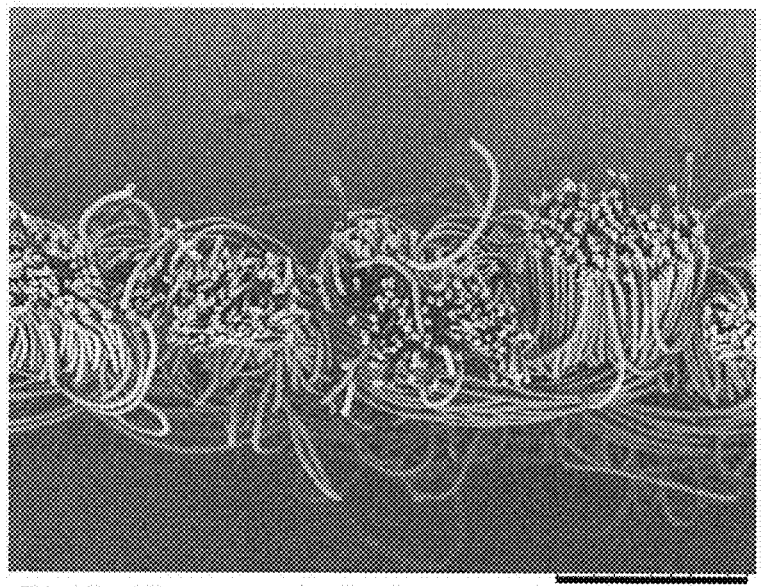
FIG. 7 is a scanning electron micrograph of a cross-section of the woven fabric depicted in FIG. 6 taken at 120× magnification according to one embodiment of the invention.

A woven fabric was constructed in the same manner as described in Example 1a and 1b with the exception that no ePTFE was included. The woven fabric was comprised of 0% ePTFE and 100% polyamide by weight. The woven fabric was dyed and printed for an acceptable visible appearance, with the color being applied to the polyamide fibers. The woven fabric had the following properties: air permeability=41 cfm, dry time=30 minutes, vertical wicking=112 mm in 10 minutes, hand=201 g, break strength=1.39 kN (w)×1.25 kN (f), tear strength=62 N (w)×58 N (f). A scanning electron micrograph of the woven fabric taken at 80× magnification is shown in FIG. 6. A scanning electron micrograph of a cross-section view of the fabric taken at 120× magnification is shown in FIG. 7. The fabric had a weight of 193 g/m2.

Example 2a

Figure 8:
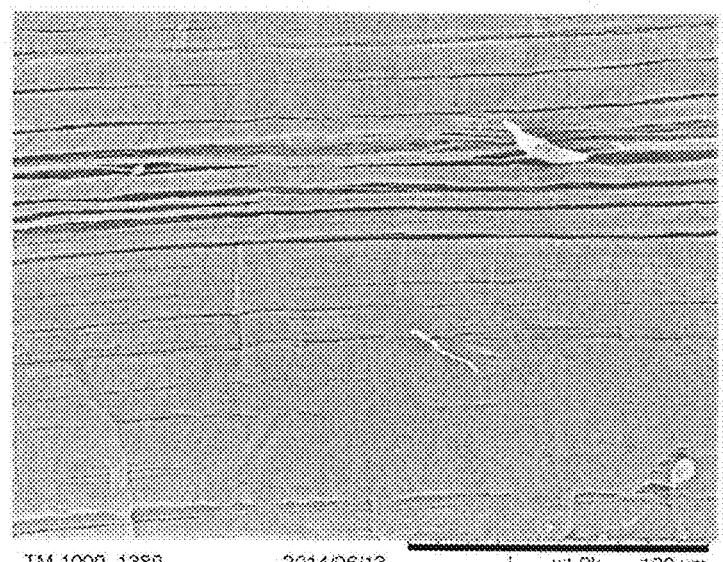
FIG. 8 is a scanning electron micrograph of the top surface of an ePTFE fiber taken at 1000× magnification according to one exemplary embodiment of the invention.

An ePTFE fiber by W.L. Gore & Associates (part number V111617, W.L. Gore & Associates, Inc., Elkton, Md.) was obtained. The ePTFE fiber measured 226 dtex and had a rectangular cross-section and possessed the following properties: width=0.5 mm, height=0.0254 mm, density=1.78 g/cm³, break strength=8.18 N, tenacity=3.64 cN/dtex. A scanning electron micrograph of the top surface of the fiber taken at 1000× magnification is shown in FIG. 8.

Figure 9:
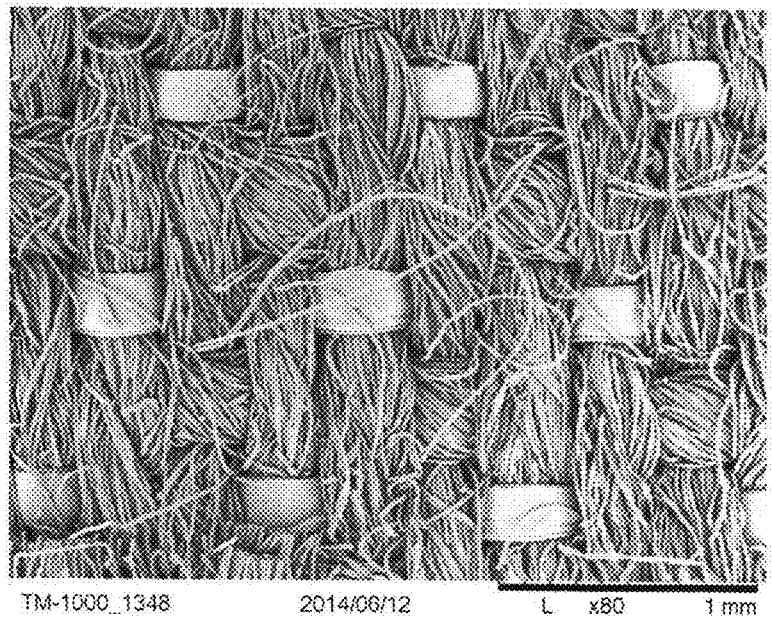
FIG. 9 is scanning electron micrograph of the top surface of a 1×2 woven twill fabric with the fiber depicted in FIG. 8 inserted at every other weft pick taken at 80× magnification in accordance with at least one exemplary embodiment of the invention.
Figure 10:
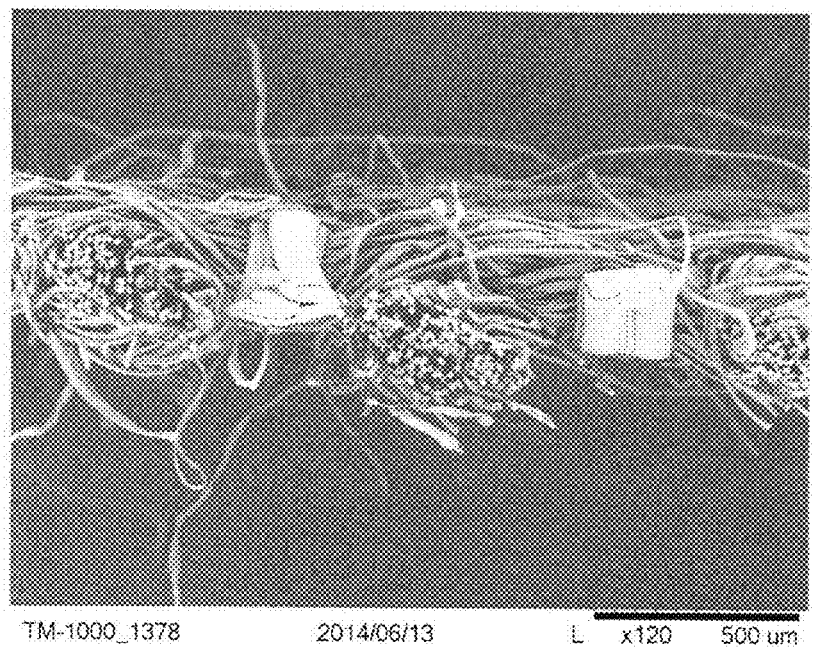
FIG. 10 is a scanning electron micrograph of a cross-section of the woven fabric depicted in FIG. 9 taken at 120× magnification according to one embodiment of the invention.

The fiber was woven to comprise a fabric blend of a 42/2 cc (cotton count/ply) 50/50 polyamide/cotton staple fiber (part number Y52NYL48CP42.00/2-1RS-03, Parkdale Mills, Gastonia, N.C.), a 17/1 cc (cotton count/ply) 50/50 polyamide/cotton staple fiber (part number Y52NYL48CP17.00-1RS-02, Parkdale Mills, Gastonia, N.C.) and the ePTFE fiber. The obtained 42/2 cc 50/50 polyamide-cotton fiber measured 286 dtex and possessed the following properties: break strength=5.74 N, tenacity=2.0 cN/dtex. The obtained 17/1 cc 50/50 polyamide/cotton fiber measured 349 dtex and possessed the following properties: break strength=6.98 N, tenacity=2.0 cN/dtex The ePTFE fiber was not twisted before weaving. The weave pattern was a 2×1 twill weave and had a thread count of 70×64 threads/inch (27.6×25.2 threads/cm, Warp×Fill). The warp fibers were comprised of the 42/2 cc polyamide-cotton fibers, and the fill fibers were comprised of the 17/1cc polyamide-cotton fibers and the ePTFE fiber in alternating picks. The woven fabric was comprised of 16% ePTFE, 42% polyamide, and 42% cotton by weight. The fabric was dyed and printed, so that the color remained in the polyamide-cotton fibers for an acceptable visible appearance. The woven fabric had the following properties: air permeability=49 cfm, dry time=27 minutes, vertical wicking=118 mm in 10 minutes, hand=134 g, break strength=658 N (w)×667 N (f), tear strength=97 N (w)×51 N (f), and no melt and no drip in vertical flame. A scanning electron micrograph of the woven fabric taken at 80× magnification is shown in FIG. 9. A scanning electron micrograph of a cross-section view of the fabric taken at 120× magnification is shown in FIG. 10. The fabric had a weight of 173 g/m2.

Example 2b

Figure 11:
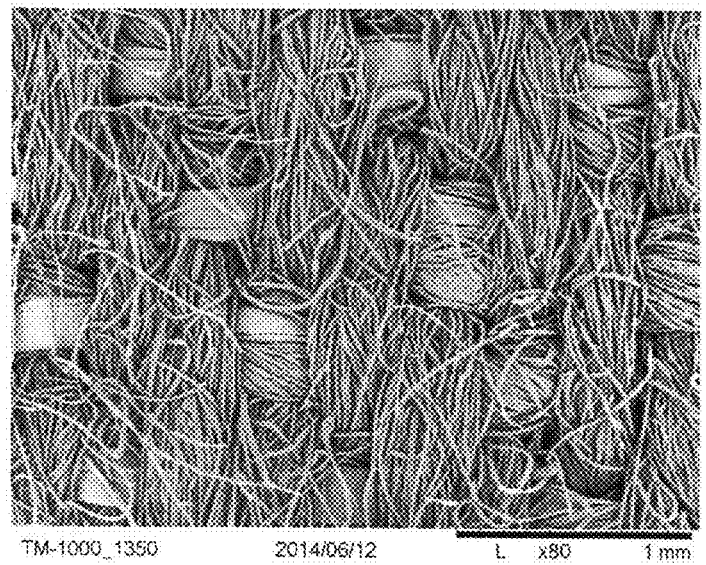
FIG. 11 is scanning electron micrograph of the top surface of a 1×2 woven twill fabric with the fiber depicted in FIG. 8, twisted and inserted at every weft pick, taken at 80× magnification in accordance with at least one embodiment of the invention.
Figure 12:
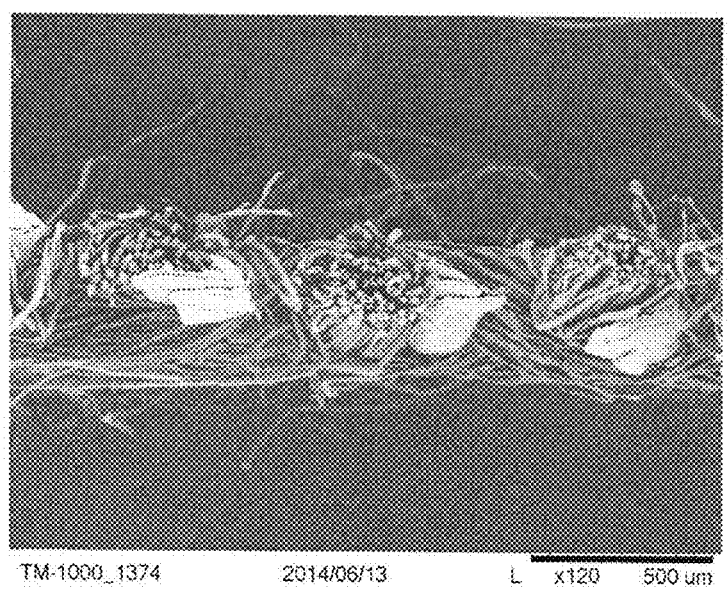
FIG. 12 is a scanning electron micrograph of a cross-section of the woven fabric depicted in FIG. 11 taken at 120× magnification according to one embodiment of the invention.

A woven fabric was constructed in a similar manner as described in Example 2a with the exception that the ePTFE was twisted with a 21.75/1 cc 50/50 polyamide/cotton staple fiber (3-2175R-02, Inman Mills, Inman, S.C.), and inserted in every pick in the fill direction of the weave. The obtained 21.75/1 cc polyamide-cotton single ply staple fiber measured 278 dtex and possessed the following properties: break strength=4.09 N, tenacity=1.49 cN/dtex. The two fibers were twisted at a level of 6 s (236 turns per meter). The weaving pattern was a 2×1 twill weave and had a thread count of 70×40 threads/inch (27.6×15.7 threads/cm, Warp×Fill). The lower pick thread count was introduced to maintain a similar weight of the fabric for comparison. The warp fibers were comprised of the 42/2 cc fibers, and the fill fibers were comprised of 21.75/Icc fibers twisted with the ePTFE fiber in every pick. The woven fabric was comprised of 20% ePTFE, 40% polyamide, and 40% cotton by weight. The woven fabric had the following properties: air permeability=58 cfm, dry time=25 minutes, vertical wicking=120 mm in 10 minutes, hand=125 g, break strength=641 N (w)×752 N (f), tear strength=88 N (w)×120 N (f), and no melt and no drip in vertical flame. A scanning electron micrograph of the woven fabric taken at 80× magnification is shown in FIG. 11. A scanning electron micrograph of a cross-section view of the fabric taken at 120× magnification is shown in FIG. 12. The fabric had a weight of 184 g/m2.

Example 2c

Figure 13:
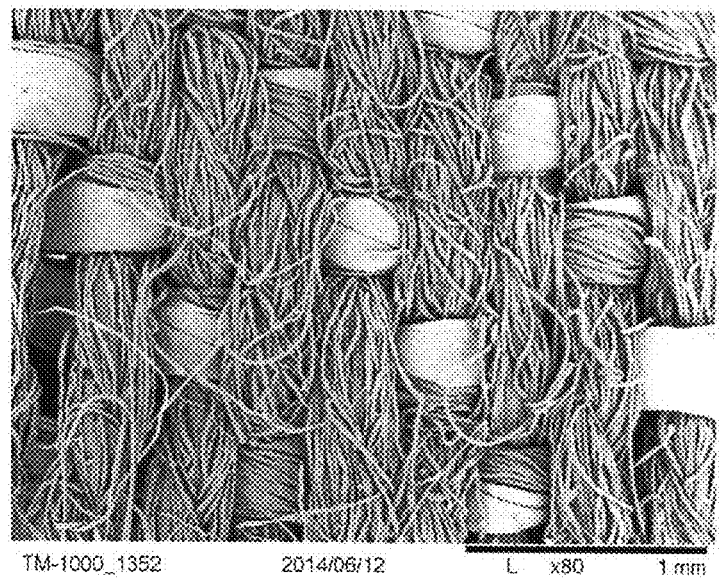
FIG. 13 is scanning electron micrograph of the top surface of a 1×2 woven twill fabric with the fiber depicted in FIG. 8, twisted and inserted at every weft pick, taken at 80× magnification according to one embodiment of the invention.
Figure 14:
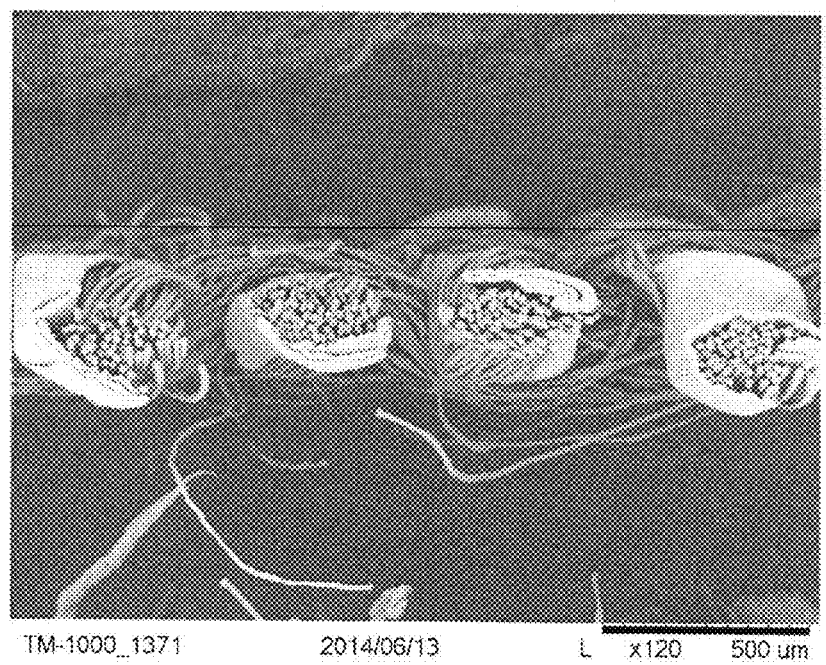
FIG. 14 is a scanning electron micrograph of a cross-section of the woven fabric depicted in FIG. 13 taken at 120× magnification in accordance with one exemplary embodiment of the invention.

A woven fabric was constructed in a similar manner as described in Example 2b with the exception that the ePTFE was twisted with a 2/70/34 (ply/denier/filament) polyamide AJT fiber (Premier Fibers, Inc., Ansonville, S.C.), and inserted in every pick in the fill direction of the weave. The obtained polyamide fiber measured 179 dtex and possessed the following properties: break strength=7.78 N, tenacity=4.37 cN/dtex. The two fibers were twisted at a level of 12 s (472 turns per meter). The weaving pattern was a 2×1 twill weave and had a thread count of 70×46 threads/inch (27.6×18.1 threads/cm, Warp×Fill). The higher pick thread count was introduced to maintain a similar weight of the fabric for comparison. The warp fibers were comprised of the 42/2 cc 50/50 polyamide/cotton fibers, and the fill fibers were comprised of 2/70/34 polyamide fibers twisted with the ePTFE fiber in every pick. The woven fabric was comprised of 22% ePTFE, 57% polyamide, and 21% cotton by weight. The woven fabric had the following properties: air permeability=70 cfm, dry time=22 minutes, vertical wicking=113 mm in 10 minutes, hand=132 g, break strength=645 N (w)×921 N (f), tear strength=70 N (w)×119 N (f), and no melt and no drip in vertical flame. A scanning electron micrograph of the woven fabric taken at 80× magnification is shown in FIG. 13. A scanning electron micrograph of a cross-section view of the fabric taken at 120× magnification is shown in FIG. 14. The fabric had a weight of 186 g/m2.

Example 2d

Figure 15:
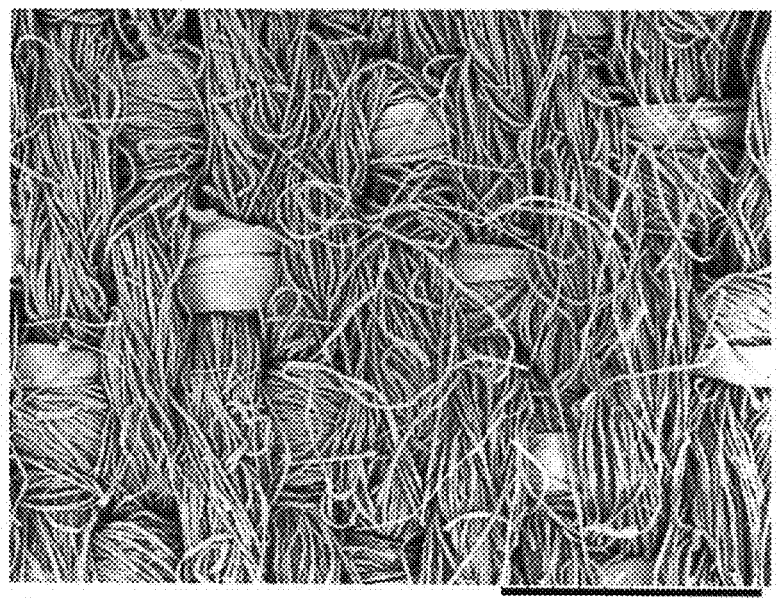
FIG. 15 is a scanning electron micrograph of the top surface of a 1×2 woven twill fabric with the fiber depicted in FIG. 8, twisted and inserted at every weft pick, taken at 80× magnification according to one embodiment of the invention.
Figure 16:
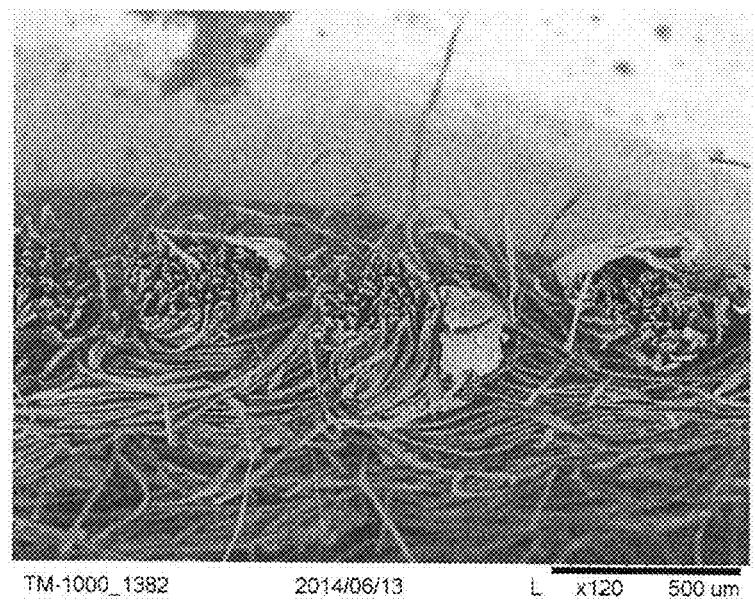
FIG. 16 is a scanning electron micrograph of a cross-section of the woven fabric depicted in FIG. 15 taken at 120× magnification in accordance with at least one exemplary embodiment of the invention.

A woven fabric was constructed in a similar manner as described in Example 2b and 2c with the exception that the ePTFE was twisted with a 20.5/1 cc cotton fiber (Inman Mills, Inman, S.C.) and inserted in every pick in the fill direction of the weave. The obtained cotton fiber measured 347 dtex and possessed the following properties: break strength=6.94 N, tenacity=2.0 cN/dtex. The two fibers were twisted at a level of 6 s (236 turns per meter). The weaving pattern was a 2×1 twill weave and had a thread count of 70×40 threads/inch (27.6×15.7 threads/cm, Warp×Fill). The pick thread count was chosen to maintain a similar weight of the fabric for comparison. The warp fibers were comprised of the 42/2 cc 50/50 polyamide/cotton fibers, and the fill fibers were comprised of the 20.5/1 cc cotton fibers twisted with the ePTFE fiber in every pick. The woven fabric was comprised of 20% ePTFE, 21% polyamide, and 59% cotton by weight. The woven fabric had the following properties: air permeability=52 cfm, dry time=27 minutes, vertical wicking=127 mm in 10 minutes, hand=137 g, break strength=654 N (w)×747 N (f), tear strength=97 N (w)×77 N (f), and no melt and no drip in vertical flame. A scanning electron micrograph of the woven fabric taken at 80× magnification is shown in FIG. 15. A scanning electron micrograph of a cross-section view of the fabric taken at 120× magnification is shown in FIG. 16. The fabric had a weight of 186 g/m2.

Example 2e

Figure 17:
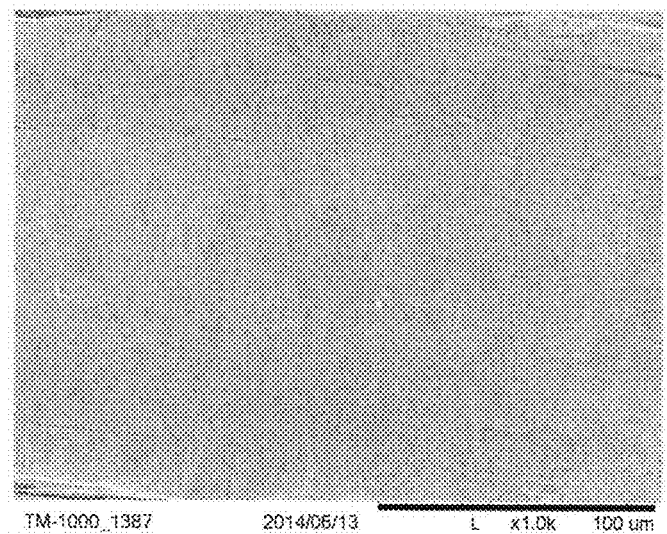
FIG. 17 is a scanning electron micrograph of the top surface of an ePTFE fiber taken at 1000× magnification according to one exemplary embodiment of the invention.

A commercially available ePTFE fiber available from W.L. Gore & Associates (part number V112961, W.L. Gore & Associates, Inc., Elkton, Md.) was obtained. The ePTFE fiber measured 457 dtex and had a rectangular cross-section and possessed the following properties: width=0.6 mm, height=0.0419 mm, density=1.82 g/cm$^3$, break strength=18.33 N, tenacity=4.03 cN/dtex. A scanning electron micrograph of the top surface of the fiber taken at 1000× magnification is shown in FIG. 17.

Figure 18:
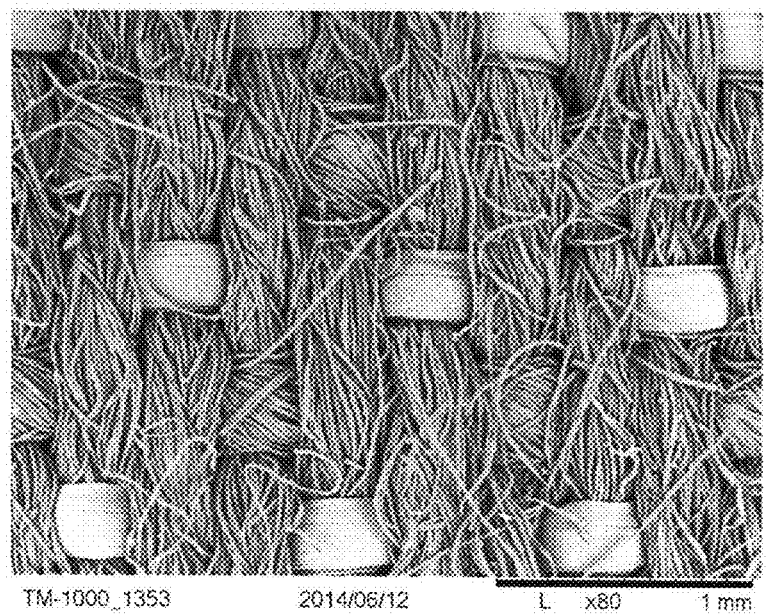
FIG. 18 is scanning electron micrograph of the top surface of a 1×2 woven twill fabric with the fiber depicted in FIG. 17 inserted at every other weft pick taken at 80× magnification according to one embodiment of the invention.
Figure 19:
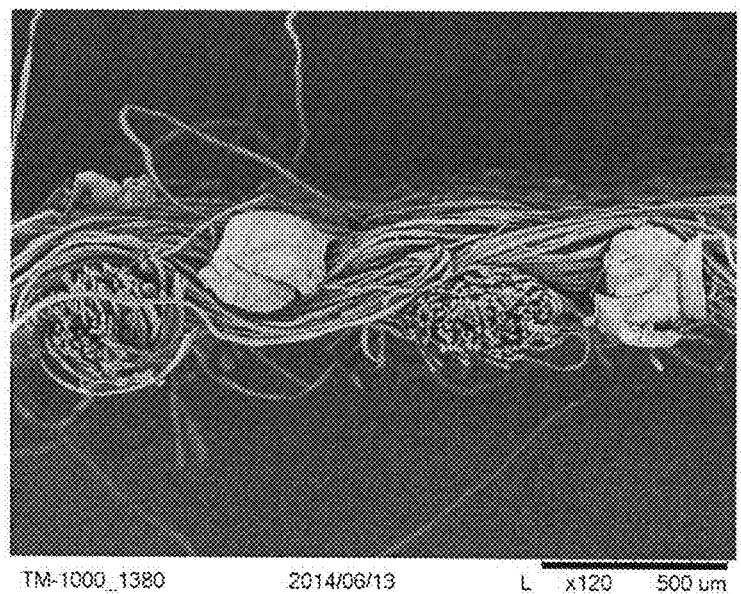
FIG. 19 is a scanning electron micrograph of a cross-section of the woven fabric depicted in FIG. 18 taken at 120× magnification in accordance with an exemplary embodiment of the invention.

A woven fabric was constructed in a similar manner as described in Example 2a with the exception that the ePTFE was 457 dtex instead of 226 dtex. The ePTFE fiber was not twisted before weaving. The weave pattern was a 2×1 twill weave and had a thread count of 70×48 threads/inch (27.6×18.9 threads/cm, Warp×Fill). The warp fibers were comprised of the 42/2 cc polyamide-cotton fibers, and the fill fibers were comprised of the 17/1 cc polyamide-cotton fibers and the ePTFE fiber in alternating picks. The woven fabric was comprised of 24% ePTFE, 38% polyamide, and 38% cotton by weight. The fabric was dyed and printed, so that the color remained in the polyamide-cotton fibers for an acceptable visible appearance. The woven fabric had the following properties: air permeability=71 cfm, dry time=24 minutes, vertical wicking=118 mm in 10 minutes, hand=148 g, break strength=658 N (w)×681 N (f), tear strength=81 N (w)×66 N (f), and no melt and no drip in vertical flame. A scanning electron micrograph of the woven fabric taken at 80× magnification is shown in FIG. 18. A scanning electron micrograph of a cross-section view of the fabric taken at 120× magnification is shown in FIG. 19. The fabric had a weight of 182 g/m2.

Example 2f

Figure 20:
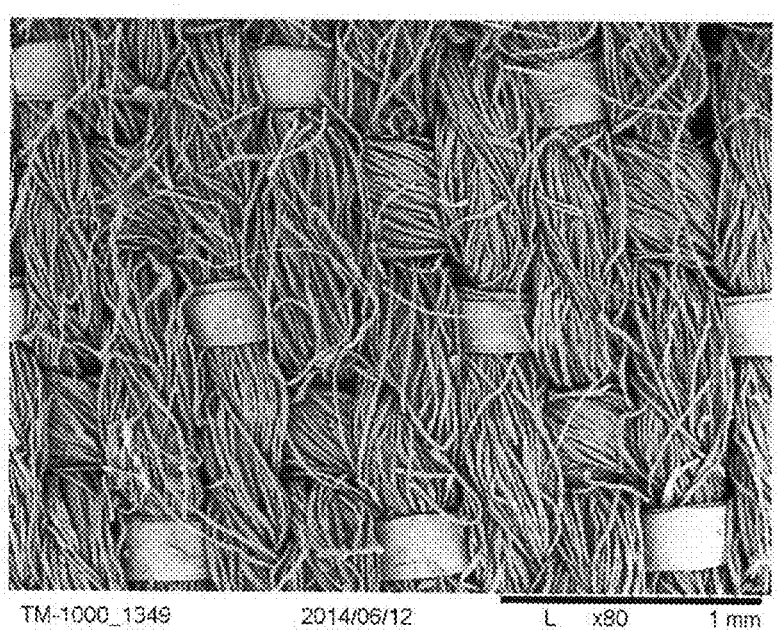
FIG. 20 is scanning electron micrograph of the top surface of a 1×2 woven twill fabric with the fiber depicted in FIG. 8 inserted at every other weft pick taken at 80× magnification according to one embodiment of the invention.
Figure 21:
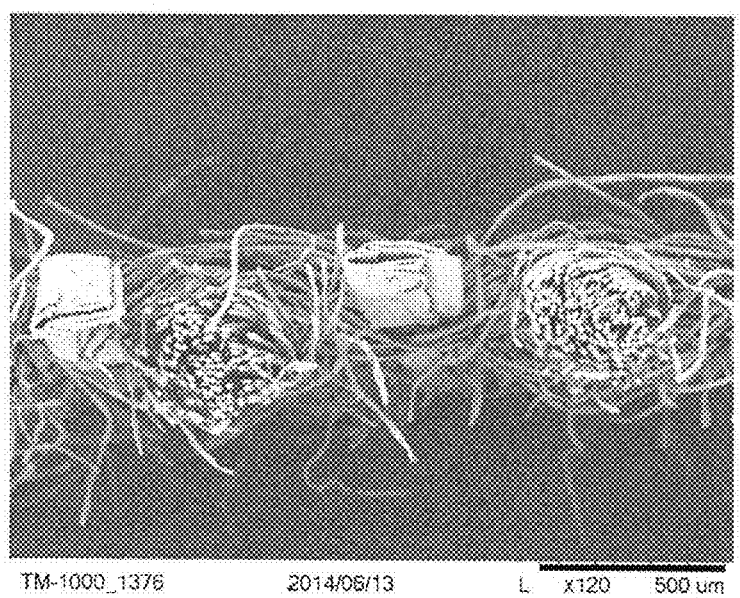
FIG. 21 is a scanning electron micrograph of a cross-section of the woven fabric depicted in FIG. 20 taken at 120× magnification in accordance with an exemplary embodiment of the invention.

A woven fabric was constructed in a similar manner as described in Example 2a with the exception that the fill direction has less picks. The ePTFE fiber was not twisted before weaving. The weave pattern was a 2×1 twill weave and had a thread count of 70×52 threads/inch (27.6×20.4 threads/cm, Warp×Fill). The warp fibers were comprised of the 42/2 cc polyamide-cotton fibers, and the fill fibers were comprised of the 17/1 cc polyamide-cotton fibers and the ePTFE fiber in alternating picks. The woven fabric was comprised of 14% ePTFE, 43% polyamide, and 43% cotton by weight. The fabric was dyed and printed, so that the color remained in the polyamide-cotton fibers for an acceptable visible appearance. The woven fabric had the following properties: air permeability=59 cfm, dry time=22 minutes, vertical wicking=115 mm in 10 minutes, hand=115 g, break strength=667 N (w)×547 N (f), tear strength=95 N (w)×60 N (f), and no melt and no drip in vertical flame. A scanning electron micrograph of the woven fabric taken at 80× magnification is shown in FIG. 20. A scanning electron micrograph of a cross-section view of the fabric taken at 120× magnification is shown in FIG. 21. The fabric had a weight of 165 g/m2.

Example 2g

A poly(vinylidene fluoride) (PVDF) monofilament fiber from Hahl Inc. (Hahl. Inc., Lexington, S.C.) was obtained. The PVDF fiber measured 267 dtex and had a substantially round cross-section and possessed the following properties: density=1.78 g/cm$^3$.

Figure 22:
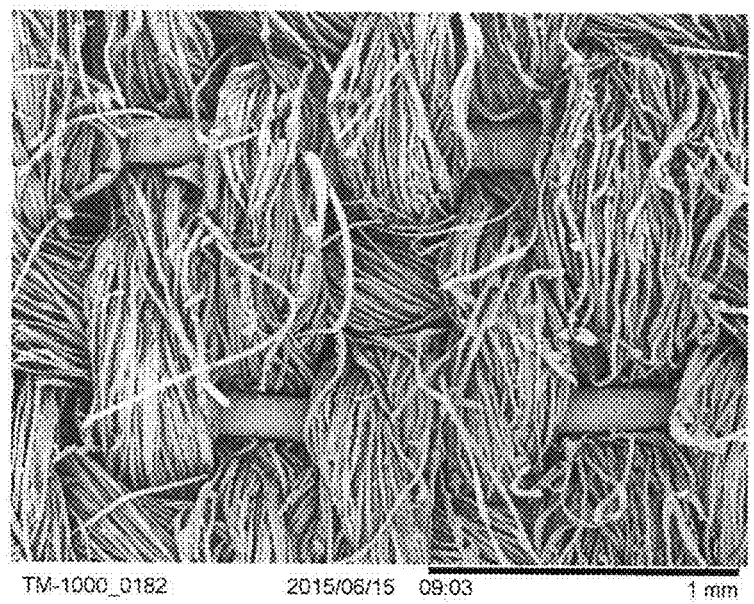
FIG. 22 is scanning electron micrograph of the top surface of a 1×2 woven twill fabric with a poly(vinylidene fluoride) (PVDF) fiber inserted at every other weft pick taken at 80× magnification according to one embodiment of the invention.
Figure 23:
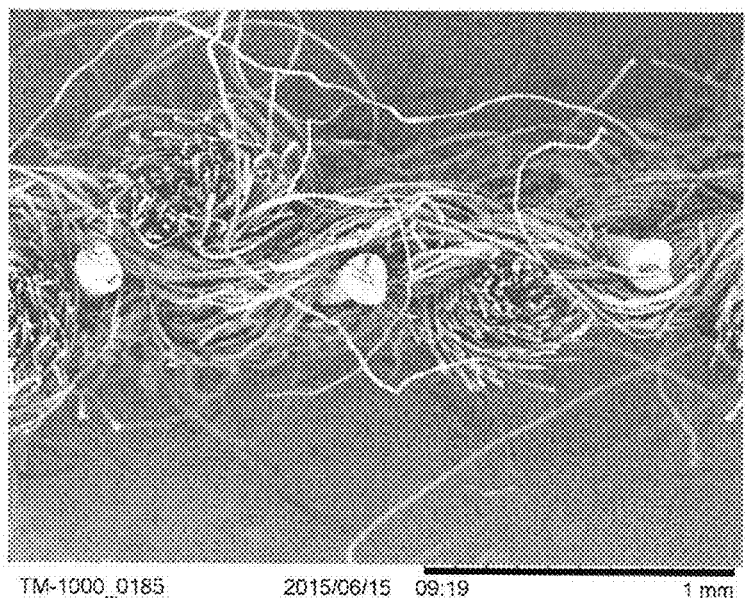
FIG. 23 is a scanning electron micrograph of a cross-section of the woven fabric depicted in FIG. 22 taken at 80× magnification in accordance with an exemplary embodiment of the invention.

A woven fabric was constructed in a similar manner as described in Example 2a with the exception that the fiber was 267 dtex PVDF. The PVDF fiber was not twisted before weaving. The weave pattern was a 2×1 twill weave and had a thread count of 70×54 threads/inch (27.6×18.9 threads/cm, Warp×Fill). The warp fibers were comprised of the 42/2 cc polyamide-cotton fibers, and the fill fibers were comprised of the 17/1 cc polyamide-cotton fibers and the PVDF fiber in alternating picks. The woven fabric was comprised of 14% PVDF, 43% polyamide, and 43% cotton by weight. The woven fabric had the following properties: air permeability=130 cfm, dry time=25 minutes, vertical wicking=110 mm in 10 minutes, hand=463 g, and no melt and no drip in vertical flame. A scanning electron micrograph of the surface of the woven fabric taken at 80× magnification is shown in FIG. 22. A scanning electron micrograph of the cross section of the woven fabric taken at 80× magnification is shown in FIG. 23.

Example 2h

A polyether ether ketone (PEEK) fiber from Hahl Inc. (Hahl, Inc., Lexington, S.C.) was obtained. The PEEK fiber measured 433 dtex and had a substantially round cross-section and possessed the following properties: density=1.32 g/cm$^3$.

Figure 24:
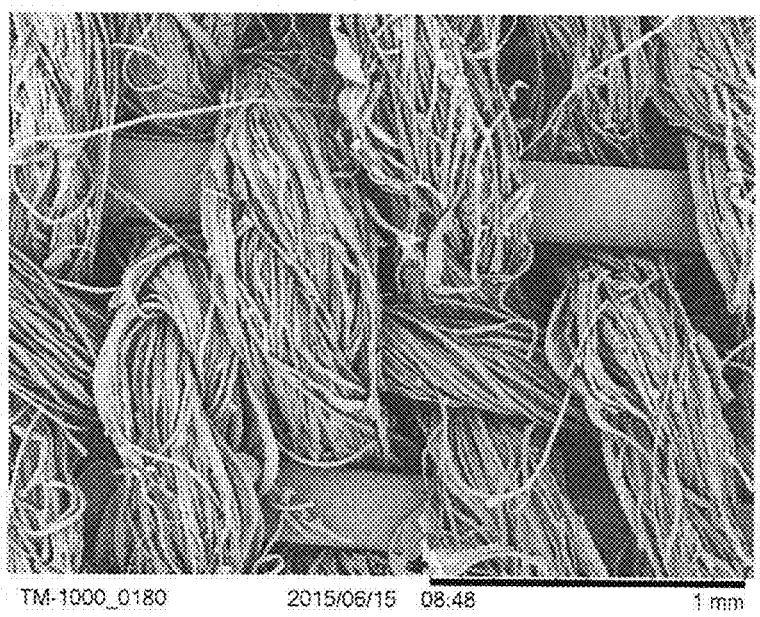
FIG. 24 is scanning electron micrograph of the top surface of a 1×2 woven twill fabric with a polyether ether ketone (PEEK) fiber inserted at every other weft pick taken at 80× magnification according to one embodiment of the invention.
Figure 25:
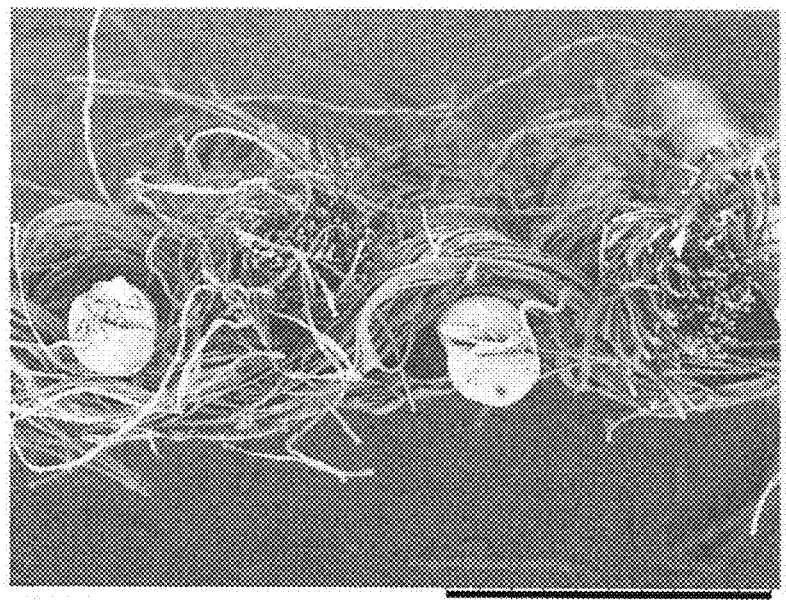
FIG. 25 is a scanning electron micrograph of a cross-section of the woven fabric depicted in FIG. 24 taken at 80× magnification in accordance with an exemplary embodiment of the invention.

A woven fabric was constructed in a similar manner as described in Example 2a with the exception that the fiber was 433 dtex PEEK. The PEEK fiber was not twisted before weaving. The weave pattern was a 2×1 twill weave and had a thread count of 70×44 threads/inch (27.6×18.9 threads/cm, Warp×Fill). The warp fibers were comprised of the 42/2 cc polyamide-cotton fibers, and the fill fibers were comprised of the 17/1 cc polyamide-cotton fibers and the PEEK fiber in alternating picks. The woven fabric was comprised of 22% PEEK, 39% polyamide, and 39% cotton by weight. The woven fabric had the following properties: air permeability=160 cfm, dry time=25 minutes, vertical wicking=120 mm in 10 minutes, hand=too stiff for test (unmeasurable), and no melt and no drip in vertical flame. A scanning electron micrograph of the surface of the woven fabric taken at 80× magnification is shown in FIG. 24. A scanning electron micrograph of the cross section of the woven fabric taken at 80× magnification is shown in FIG. 25.

Example 21

A polyphenylene sulfide (PPS) fiber from Shakespeare Company LLC. (Shakespeare Company LLC., Columbia, S.C.) was obtained. The PPS fiber measured 422 dtex and had a substantially round cross-section and possessed the following properties: density=1.35 g/cm$^3$.

Figure 26:
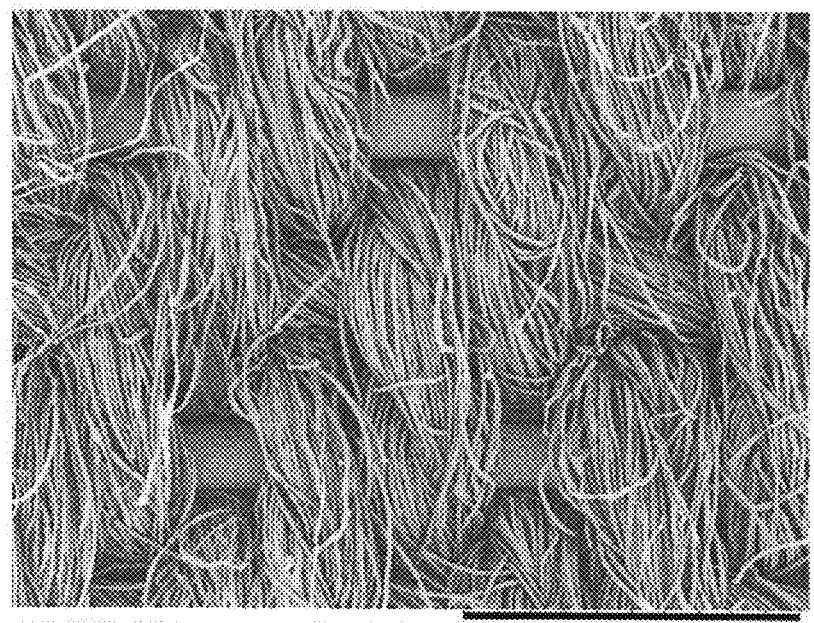
FIG. 26 is scanning electron micrograph of the top surface of a 1×2 woven twill fabric with a polyphenylene sulfide (PPS) fiber inserted at every other weft pick taken at 80× magnification according to one embodiment of the invention.
Figure 27:
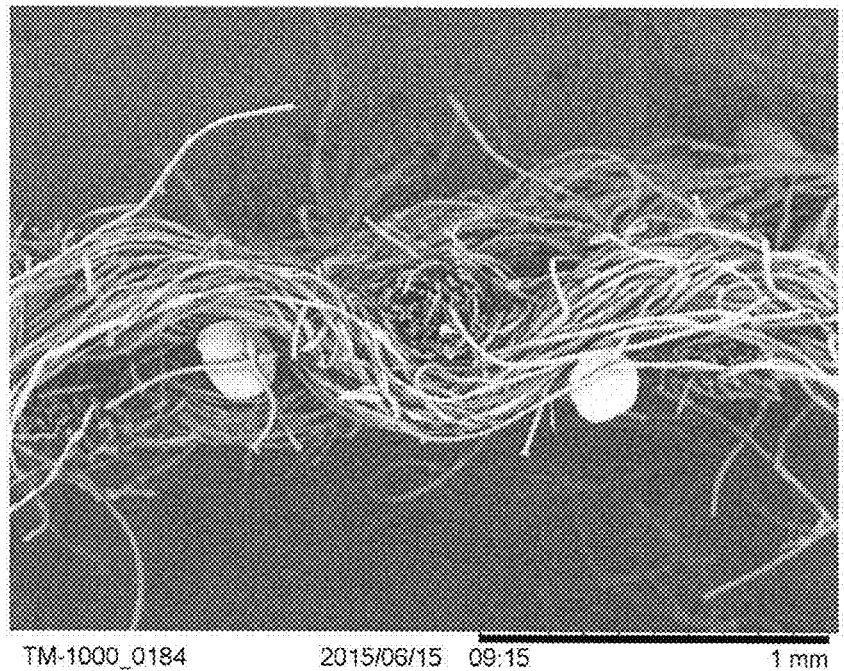
FIG. 27 is a scanning electron micrograph of a cross-section of the woven fabric depicted in FIG. 26 taken at 80× magnification in accordance with an exemplary embodiment of the invention.

A woven fabric was constructed in a similar manner as described in Example 2a with the exception that the fiber was 422 dtex PPS. The PPS fiber was not twisted before weaving. The weave pattern was a 2×1 twill weave and had a thread count of 70×48 threads/inch (27.6×18.9 threads/cm, Warp×Fill). The warp fibers were comprised of the 42/2 cc polyamide-cotton fibers, and the fill fibers were comprised of the 17/1 cc polyamide-cotton fibers and the PPS fiber in alternating picks. The woven fabric was comprised of 22% PPS, 39% polyamide, and 39% cotton by weight. The woven fabric had the following properties: air permeability=120 cfm, dry time=25 minutes, vertical wicking=95 mm in 10 minutes, hand=too stiff for test (unmeasurable), and no melt and no drip in vertical flame. A scanning electron micrograph of the surface of the woven fabric taken at 80× magnification is shown in FIG. 26. A scanning electron micrograph of the cross section of the woven fabric taken at 80× magnification is shown in FIG. 27.

Comparative Example 2j

Figure 28:
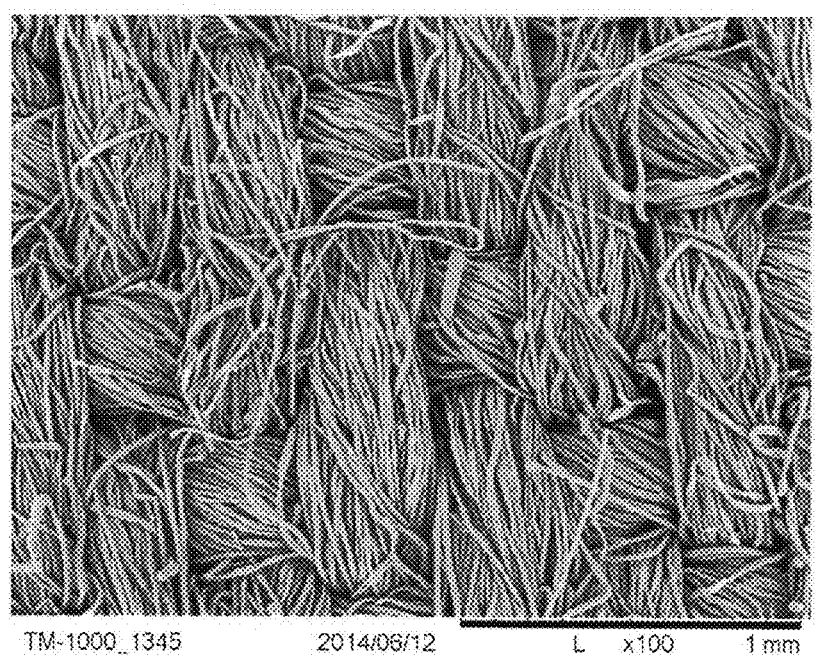
FIG. 28 is scanning electron micrograph of the top surface of a 1×2 woven twill fabric of polyamide/cotton fibers taken at 80× magnification according to one embodiment of the invention.
Figure 29:
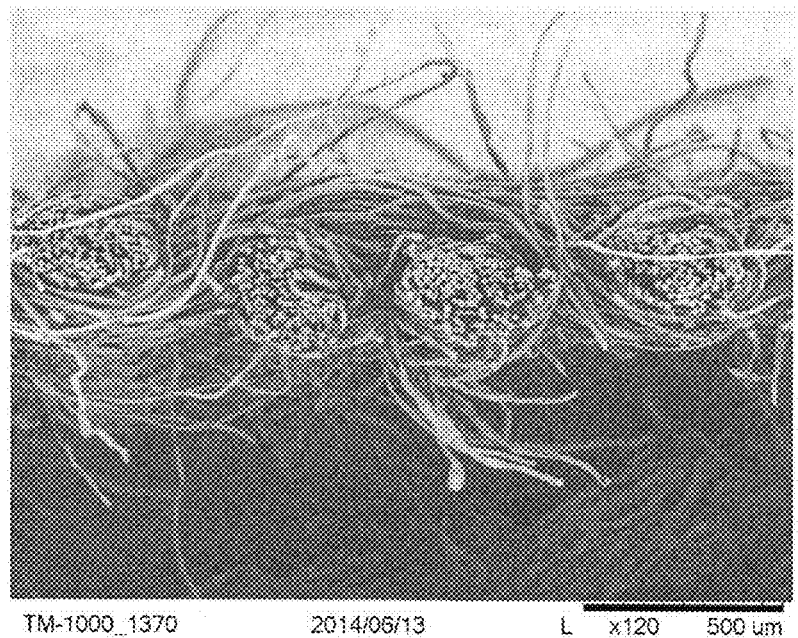
FIG. 29 is a scanning electron micrograph of a cross-section of the woven fabric depicted in FIG. 22 taken at 120× magnification in accordance with at least one exemplary embodiment of the invention.

A woven fabric was constructed in a similar manner as described in Example 2a with the exception that no ePTFE was included. The weave pattern was a 2×1 twill weave and had a thread count of 70×50 threads/inch (27.6×19.7 threads/cm, Warp×Fill). The warp fibers were comprised of the 42/2 cc polyamide-cotton fibers, and the fill fibers were comprised of the 17/1 cc polyamide-cotton fibers. The woven fabric was comprised of 50% polyamide and 50% cotton by weight. The fabric was dyed and printed, so that the color remained in the polyamide-cotton fibers for an acceptable visible appearance. The woven fabric had the following properties: air permeability=54 cfm, dry time=28 minutes, vertical wicking=119 mm in 10 minutes, hand=114 g, break strength=667 N (w)×516 N (f), tear strength=47 N (w)×50 N (f), and no melt and no drip in vertical flame. A scanning electron micrograph of the woven fabric taken at 80× magnification is shown in FIG. 28. A scanning electron micrograph of a cross-sectional view of the fabric taken at 120× magnification is shown in FIG. 29. The fabric had a weight of 176 g/m$^2$.

Example 3a

An ePTFE fiber by W.L. Gore & Associates (part number V111617, W.L. Gore & Associates, Inc., Elkton, Md.) was obtained. The ePTFE fiber measured 226 dtex and had a rectangular cross-section and possessed the following properties: width=0.5 mm, height=0.0254 mm, density=1.78 g/cm$^3$, break strength=8.18 N, tenacity=3.64 cN/dtex. A scanning electron micrograph of the top surface of the fiber taken at 1000× magnification is shown in FIG. 8.

The fiber was woven to comprise a fabric blend of a 36/2 cc (cotton count/ply) Nomex® aramid staple fiber (2566000, Springfield LLC, Gaffney, S.C.), a 38/1 cc (cotton count/ply) Nomex® aramid staple fiber (2000000, Springfield LLC, Gaffney, S.C., and the ePTFE fiber. The obtained 36/2 cc Nomex® aramid staple fiber measured 294 dtex and possessed the following properties: break strength=6.40 N, tenacity=2.2 cN/dtex. The obtained 38/1 cc Nomex® aramid staple fiber measured 349 dtex and possessed the following properties: break strength=2.45 N, tenacity=1.6 cN/dtex. The ePTFE fiber and the 38/1 cc Nomex® aramid fiber were twisted at 6 s (236 turns per meter) prior to weaving. The weave pattern was a plain weave and had a thread count of 60×40 threads/inch (23.6×15.7 threads/cm, Warp×Fill). The warp fibers were comprised of the 36/2 cc Nomex® aramid fibers, and the fill fibers were comprised of the twisted 38/1cc Nomex® aramid fibers and the ePTFE fiber in every pick. The woven fabric was comprised of 22% ePTFE and 78% Nomex® aramid by weight. The fabric was dyed and printed, so that the color remained in the Nomex® aramid fibers for an acceptable visible appearance. The woven fabric had the following properties: air permeability=238 cfm, dry time=15 minutes, vertical wicking=92 mm in 10 minutes, tear strength=67 N (w)×76 N (f), and no after flame in vertical flame. A scanning electron micrograph of the surface of the woven fabric taken at 80× magnification is shown in FIG. 30. A scanning electron micrograph of a cross-sectional view of the fabric taken at 120× magnification is shown in FIG. 31. The fabric had a weight of 155 g/m$^2$.

Comparative Example 3a

A woven fabric was constructed in a similar manner as described in Example 3a with the exception that no ePTFE was included. The weave pattern was a plain weave and had a thread count of 60×40 threads/inch (23.6×15.7 threads/cm, Warp×Fill). The warp fibers were comprised of the 36/2 cc Nomex® aramid fibers, and the fill fibers were also comprised of the 36/2 cc Nomex® aramid fibers. The woven fabric was comprised of 0% ePTFE and 100% Nomex® aramid by weight. The fabric was dyed and printed, so that the color remained in the Nomex® aramid fibers for an acceptable visible appearance. The woven fabric had the following properties: air permeability=201 cfm, dry time=20 minutes, vertical wicking=95 mm in 10 minutes, tear strength=35 N (w)×28 N (f), and no after flame in vertical flame. The fabric had a weight of 154 g/m$^2$.

Example 3b

A woven fabric was constructed in a similar manner as described in Example 3a with the exception that the ePTFE was twisted with a 30/1 cc cotton fiber (Inman Mills, Inman, S.C.) and inserted in every pick in the fill direction of the weave. The obtained cotton fiber measured 197 dtex and possessed the following properties: tenacity=2.0 cN/dtex. The two fibers were twisted at a level of 8 s (315 turns per meter). The weaving pattern was a 3×1 twill weave and had a thread count of 60×46 threads/inch (23.6×18.1 threads/cm, Warp×Fill). The warp fibers were comprised of the 36/2 cc Nomex® aramid fibers, and the fill fibers were comprised of the twisted 30/1 cc cotton fibers and the ePTFE fiber in every pick. The woven fabric was comprised of 26% ePTFE, 23% cotton, and 51% Nomex® aramid by weight. The fabric was dyed so that the color remained in the Nomex® aramid fibers for an acceptable visible appearance. The fabric was also finished with an FR treatment to enable the cotton to be flame retardant. The woven fabric had the following properties: air permeability=200 cfm, dry time=20 minutes, vertical wicking (warp direction)=110 mm in 10 minutes, vertical wicking (fill direction)=140 mm in 10 minutes, thermal shrinkage=0.25% (w)×−2.0% (f), tear strength=73 N (w)×93 N (f), break strength=703 N (w)×489 N (f), tear strength after 100 home laundry cycles=100 N (w)×77 N (f), break strength after 100 home laundry cycles=723 N (w)× 609 N (f), and no after flame in vertical flame. The fabric had a weight of 183 g/m².

Example 3c

A woven fabric was constructed in a similar manner as described in Example 3b with the exception that the fabric was woven as a plain weave. The warp fibers were comprised of the 36/2 cc Nomex® aramid fibers, and the fill fibers were comprised of the twisted 30/1 cc cotton fibers and the ePTFE fiber in every pick. The woven fabric was comprised of 26% ePTFE, 23% cotton, and 51% Nomex® aramid by weight. The fabric was dyed so that the color remained in the Nomex® aramid fibers for an acceptable visible appearance. The fabric was also finished with an FR treatment to enable the cotton to be flame retardant. The woven fabric had the following properties: air permeability=100 cfm, dry time=20 minutes, vertical wicking (warp direction)=110 mm in 10 minutes, vertical wicking (fill direction)=140 mm in 10 minutes, thermal shrinkage=0% (w)×−2.25% (f), tear strength=78 N (w)×69 N (f), break strength=854 N (w)×605 N (f), and no after flame in vertical flame. The fabric had a weight of 183 g/m².

Example 3d

A woven fabric was constructed in a similar manner as described in Example 3c except no Nomex® aramid fiber was used. The ePTFE fiber was twisted with a 40/1 cc cotton fiber (Inman Mills, Inman, S.C.) and was used in both the warp and fill directions, and inserted in every end and pick of the weave. The two fibers were twisted at a level of 10 s (394 turns per meter). The obtained cotton fiber measured 148 dtex and possessed the following properties: tenacity=2.0 cN/dtex. The weaving pattern was a plain weave and had a thread count of 60×54 threads/inch (23.6×21.2 threads/cm, Warp×Fill). The woven fabric was comprised of 60% ePTFE and 40% cotton by weight. The fabric was dyed and finished so that the color remained in the cotton fibers for an acceptable visible appearance. The fabric was also finished with an FR treatment to enable the cotton to be flame retardant. The woven fabric had the following properties: air permeability=95 cfm, dry time=25 minutes, tear strength=69 N (w)×71 N (f), break strength=698 N (w)×707 N (f), and no after flame in vertical flame. The fabric had a weight of 200 g/m².

Example 4a

A knitted sock was made in the following manner. An ePTFE fiber having a density of 1.94 g/cm³ (part number V111776, W.L. Gore & Associates, Inc., Elkton, Md.) was obtained. The ePTFE fiber measured 111 dtex and had a rectangular cross-section and possessed the following properties: width=0.5 mm, height=0.0114 mm, density=1.94 g/cm³, break strength=3.96 N, tenacity=3.58 cN/dtex, and fibril length=indeterminate (no visible nodes to define an endpoint for the fibrils). A scanning electron micrograph of the top surface of the fiber taken at 1000×.

magnification is shown in FIG. 32. A scanning electron micrograph of the surface of the knitted fabric taken at 80× magnification is shown in FIG. 33. Each ePTFE fiber was knitted with a 70 denier (34 filament count) nylon 6,6 yarn using a 4.5 inch diameter 200 needle (stitches per complete rotation) circular knitting machine with a heel and an elasticated ankle band. The final PTFE content was 68.8% by weight (nylon content was 31.2%). The final sock after seaming the toe area with 2 ply of 30 denier nylon 6,6 yarn was a size 10 (U.S. mens sizing) and was rendered hydrophilic by washing in a washing machine for a single cycle with commercially available fabric softener (Melasoft LS 1C2800 available from Melatex Incorporated, 3818 Northmore Street, Charlotte, N.C. 28205).

A 1×6 inch swatch of this high density ePTFE sock was subjected to the Vertical Wicking Test described above. The high density ePTFE sock exhibited wicking of 17 mm after 10 minutes.

The high density ePTFE socks was subjected to the Weight Gain and Drying Time test listed above. The initial weight of the fabric was 178 gsm. The overall weight gain as measured in the Weight Gain and Drying Time Test Method for the fabric was 23 gsm, or 13%.

Comparative Example 4b

A comparative sock was made in the same manner as described in Example 4a except that the ePTFE fibers were replaced with an equal number of 70 denier Nylon 6,6 yarns. A 1×6 inch swatch of the all nylon sock was subjected to the Vertical Wicking Test described above. The all nylon fiber sock exhibited wicking of 10 mm after 10 minutes.

The all nylon sock was also subjected to the Weight Gain and Drying Time test listed above. The initial weight of the fabric was 143 gsm. The overall weight gain as measured in the Weight Gain and Drying Time Test Method for the fabric was 39 gsm, or 27%.

Example 5a

The ePTFE fiber from Example 4 was woven to comprise a fabric blend of a 70/34 (denier/filaments) semi-dull flat polyamide fiber (Premier Fibers, Inc., Ansonville, S.C.) and the ePTFE fiber. The obtained polyamide fiber measured 78 dtex. The weave pattern was a plain weave and had a thread count of 96×92 threads/inch (37.7×36.2 threads/cm, Warp× Fill). The warp fibers were comprised of the polyamide fibers, and the fill fibers were comprised of the ePTFE fiber in every pick. The woven fabric was comprised of 58% ePTFE and 42% polyamide by weight. The fabric was dyed so that the color remained in the polyamide fibers for an acceptable visible appearance. The woven fabric had the following properties: air permeability=105 cfm, weight=77 gsm, water weight gain=10 gsm, MVTR=32981 g/m2/24 hours. A scanning electron micrograph of the surface of the woven fabric taken at 80× magnification is shown in FIG. 34. A scanning electron micrograph of a cross-section view of the fabric taken at 150× magnification is shown in FIG. 35.

An amorphously locked ePTFE membrane was obtained having the following properties: thickness=0.04 mm, density=0.47 g/cc, matrix tensile strength in the strongest direction=105.8 MPa, matrix tensile strength in the direction orthogonal to the strongest direction=49.9 MPa, Gurley=16.2 s, MVTR=64168 g/m2/24 hours. Polyurethane (PU) was applied by continuously coating the ePTFE membrane and allowing it to at least partially penetrate the pores of the membrane, then cured.

The woven fabric was laminated to the ePTFE membrane composite in the following manner. The fabric and the ePTFE membrane composite were bonded together by applying a dot pattern of a melted polyurethane adhesive to the PU side of the membrane. While the polyurethane adhesive dots were molten, the fabric was positioned on top of the adhesive side of the membrane. This construct (article) was allowed to cool.

The resulting article had the following properties: hand=199 g, MVTR=8795 g/m2/24 hours, and water repellency=70%.

A fluoroacrylate coating was applied to the woven fabric in order to render it hydrophobic and oleophobic.

The resulting article had the following property: water repellency=100%. A scanning electron micrograph of a cross-section view of the fabric taken at 120× magnification is shown in FIG. 36.

Example 5b

A woven fabric was constructed similarly to Example 5a, except the ePTFE fiber was woven in every other pick in the fill direction. The woven fabric was comprised of 29% ePTFE and 71% polyamide by weight. The fabric was dyed so that the color remained in the polyamide fibers for an acceptable visible appearance. The woven fabric had the following properties: air permeability=34 cfm, weight=73 gsm, water weight gain=17 gsm, MVTR=28482 g/m2/24 hours. A scanning electron micrograph of the woven fabric taken at 80× magnification is shown in FIG. 37. A scanning electron micrograph of a cross-section view of the fabric taken at 150× magnification is shown in FIG. 38.

An amorphously locked ePTFE membrane was obtained having the following properties: thickness=0.04 mm, density=0.47 g/cc, matrix tensile strength in the strongest direction=105.8 MPa, matrix tensile strength in the direction orthogonal to the strongest direction=49.9 MPa, Gurley=16.2 s, MVTR=64168 g/m2/24 hours. Polyurethane (PU) was applied by continuously coating the ePTFE membrane and allowing it to at least partially penetrate the pores of the membrane, then cured.

The woven fabric was laminated to the ePTFE membrane composite in the following manner. The fabric and the ePTFE membrane composite were bonded together by applying a dot pattern of a melted polyurethane adhesive to the polyurethane side of the membrane. While the polyurethane adhesive dots were molten, the fabric was positioned on top of the adhesive side of the membrane. This construct (article) was allowed to cool.

The resulting article had the following properties: hand=207 g, MVTR=9075 g/m2/24 hours, and water repellency=50%.

A fluoroacrylate coating was applied to the woven fabric in order to render it hydrophobic and oleophobic.

The resulting article had the following property: water repellency=100%. A scanning electron micrograph of a cross-section view of the fabric taken at 120× magnification is shown in FIG. 39.

Comparative Example 5c

A woven fabric was constructed similarly to Example 5a, except no ePTFE fiber was used. The woven fabric was comprised of 0% ePTFE and 100% polyamide by weight. The fabric was dyed so that the color remained in the polyamide fibers for an acceptable visible appearance. The woven fabric had the following properties: air permeability=30 cfm, weight=65 gsm, water weight gain=25 gsm, MVTR=28526 g/m2/24 hours. A scanning electron micrograph of the surface of the woven fabric taken at 80× magnification is shown in FIG. 40. A scanning electron micrograph of a cross-section view of the fabric taken at 150× magnification is shown in FIG. 41.

An amorphously locked ePTFE membrane was obtained having the following properties: thickness=0.04 mm, density=0.47 g/cc, matrix tensile strength in the strongest direction=105.8 MPa, matrix tensile strength in the direction orthogonal to the strongest direction=49.9 MPa, Gurley=16.2 s, MVTR=64168 g/m2/24 hours. Polyurethane (PU) was applied by continuously coating the ePTFE membrane and allowing it to at least partially penetrate the pores of the membrane, then cured.

The woven fabric was laminated to the ePTFE membrane composite in the following manner. The fabric and the ePTFE membrane composite were bonded together by applying a dot pattern of a melted polyurethane adhesive to the PU side of the membrane. While the polyurethane adhesive dots were molten, the fabric was positioned on top of the adhesive side of the membrane. This construct (article) was allowed to cool.

The resulting article had the following properties: hand=205 g, MVTR=9508 g/m2/24 hours, and water repellency=0%.

A fluoroacrylate coating was applied to the woven fabric in order to render it hydrophobic and oleophobic.

The resulting article had the following property: water repellency=100%. A scanning electron micrograph of a cross-section view of the fabric taken at 120× magnification is shown in FIG. 42.

Example 6

The ePTFE fiber from Example 5 was woven to comprise a fabric blend of a 70/34 (denier/filaments) textured 6,6 nylon and the ePTFE fiber. The obtained nylon fiber measured 78 dtex. The weave pattern was a 1×2 twill and had a thread count of 100×100 threads/inch (37.7×36.2 threads/cm. Warp×Fill). The warp fibers were comprised of the polyamide fibers, and the fill fibers were comprised of the ePTFE fiber in every other pick. The woven fabric was comprised of 32% ePTFE and 68% polyamide by weight. The woven fabric had the following properties: air permeability=75 cfm, weight=132 gsm, water weight gain=34 gsm, with some stretch and recovery capability due to the textured nylon. A scanning electron micrograph of the surface of the woven fabric taken at 80× magnification is shown in FIG. 43. A scanning electron micrograph of a cross-section view of the fabric taken at 120× magnification is shown in FIG. 44.

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A woven fabric comprising:
   a plurality of warp and weft fibers, said warp fibers comprising at least one fire resistant fiber and said weft fibers comprising at least one expanded polytetrafluoroethylene (ePTFE) fiber twisted with at least one cellulosic fiber,
   wherein said ePTFE fiber has a weight per length of greater than about 20 dtex.

2. The woven fabric of claim 1, wherein said at least one ePTFE fiber has therein a colorant to color said ePTFE fiber.

3. The woven fabric of claim 1, wherein said at least one cellulosic fiber comprises a fire resistant cotton fiber.

4. The woven fabric of claim 1, further comprising a polymer membrane affixed to at least one side of said fabric.

5. A woven fabric comprising:
   a plurality of warp and weft fibers, said warp fibers comprising at least one first polymer/cotton fiber and said weft fibers comprising an expanded polytetrafluoroethylene (ePTFE) fiber and a second polymer/cotton fiber in an alternated configuration,
   wherein said ePTFE fibers have a weight per length greater than about 20 dtex.

6. The woven fabric of claim 5, wherein said first polymer/cotton fiber and said second polymer cotton fiber are of the same fiber type.

7. The woven fabric of claim 5, further comprising a polymer membrane affixed to at least one side of said fabric.

8. A woven fabric comprising:
   a plurality of warp and weft fibers, said warp fibers comprising blended cotton fibers and said weft fibers comprising expanded polytetrafluoroethylene (ePTFE) fibers,
   wherein said ePTFE fiber has a weight per length of greater than about 20 dtex.

9. The woven fabric of claim 8, wherein said blended cotton fibers are selected from polyester/cotton fibers and nylon/cotton fibers.

10. The woven fabric of claim 8, wherein said ePTFE fibers are twisted.

11. The woven fabric of claim 8, wherein said ePTFE fibers are combined with a cotton fiber or said blended cotton fiber.

12. The woven fabric of claim 8, wherein said weft fibers comprise said ePTFE fibers at every other pick.

13. The woven fabric of claim 8, further comprising a polymer membrane affixed to at least one side of said fabric.

14. A woven fabric comprising:
   a plurality of warp and weft fibers, said warp fibers comprising blended synthetic fibers and said weft fibers comprising expanded polytetrafluoroethylene (ePTFE) fibers,
   wherein said ePTFE fiber has a weight per length of greater than about 20 dtex.

15. The woven fabric of claim 14, wherein said blended synthetic fibers comprise nylon/lycra fibers.

16. The woven fabric of claim 14, wherein said weft fibers comprise said ePTFE fibers at every other pick.

17. The woven fabric of claim 14, further comprising a polymer membrane affixed to at least one side of said fabric.

18. A woven fabric comprising:
   a plurality of warp and weft fibers, said warp fibers comprising at least one expanded polytetrafluoroethylene (ePTFE) fiber twisted with at least one cellulosic fiber and said weft fibers comprising at least one expanded polytetrafluoroethylene (ePTFE) fiber twisted with at least one cellulosic fiber,
   wherein said ePTFE fiber has a weight per length of greater than about 20 dtex.

19. The woven fabric of claim 18, further comprising a polymer membrane affixed to at least one side of said fabric.

20. A knit fabric comprising:
   expanded polytetrafluoroethylene (ePTFE) fibers combined with non-polytetrafluoroethylene (PTFE) fibers in a knit configuration,
   wherein said ePTFE fibers have a weight per length greater than about 20 dtex.

21. The knit fabric of claim 20 wherein said ePTFE fibers are positioned in a side-by-side configuration with said non-PTFE fibers.

22. The knit fabric of claim 20, wherein said fabric comprises alternating knits of said ePTFE fibers and said non-PTFE fibers.

23. The knit fabric of claim 20, wherein said fabric comprises said ePTFE fibers and said non-PTFE fibers at repeating intervals.

24. The knit fabric of claim 20, wherein said fabric comprises said ePTFE fibers and said non-PTFE fibers at non-repeating intervals.

25. The knit fabric of claim 20, further comprising a fire resistant fiber.

26. A woven fabric comprising:
   a plurality of warp fibers and weft fibers,
   wherein at least one of said warp fibers and said weft fibers comprise expanded polytetrafluoroethylene (ePTFE) fibers,
   wherein at least one of said warp fibers and said weft comprise non-polytetrafluoroethylene (PTFE) fibers, and
   wherein said ePTFE fibers have a weight per length from about 20 dtex to about 1200 dtex.

27. The woven fabric of claim 26, further comprising a polymer membrane affixed to at least one side of said fabric.

28. The woven fabric of claim 26, wherein said ePTFE fibers contain therein a colorant to color said ePTFE fibers.

* * * * *